US008460095B2

(12) United States Patent
Tan

(10) Patent No.: US 8,460,095 B2
(45) **Date of Patent: *Jun. 11, 2013**

(54) GAMING SYSTEM AND METHOD FOR PROVIDING ENHANCED PLAYER OPPORTUNITIES FOR DEPOSITING MONETARY AMOUNTS ABOVE A DESIGNATED LEVEL

(75) Inventor: Carmen Atienza Tan, Daly City, CA (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,598

(22) Filed: Jul. 23, 2012

(65) Prior Publication Data

US 2012/0289314 A1 Nov. 15, 2012

Related U.S. Application Data

(63) Continuation of application No. 11/554,489, filed on Oct. 30, 2006, now Pat. No. 8,235,801.

(51) Int. Cl.
*A63F 13/00* (2006.01)

(52) U.S. Cl.
USPC .................. 463/25; 463/17; 463/18; 463/19; 463/20

(58) Field of Classification Search
USPC ...................................................... 463/25–28
See application file for complete search history.

(56) References Cited

U.S. PATENT DOCUMENTS

| | | | |
|---|---|---|---|
| 3,628,259 | A | 12/1971 | Kahn |
| 4,013,157 | A | 3/1977 | Britz et al. |
| 4,156,976 | A | 6/1979 | Mikun |
| 4,621,814 | A | 11/1986 | Stepan et al. |
| 4,624,459 | A | 11/1986 | Kaufman |
| 4,636,951 | A | 1/1987 | Harlick |
| 4,669,731 | A | 6/1987 | Clarke |

(Continued)

FOREIGN PATENT DOCUMENTS

| | | |
|---|---|---|
| AU | 771847 | 3/2001 |
| AU | 200065501 | 3/2001 |

(Continued)

OTHER PUBLICATIONS

"A Salute to Game Shows," The Price is Right—Pricing Games, printed from schuminweb.com/game-shows/shows/price-is-right/pricing-games.htm on Mar. 16, 2001.

(Continued)

*Primary Examiner* — Ronald Laneau
*Assistant Examiner* — Justin Myhr
(74) *Attorney, Agent, or Firm* — Neal, Gerber & Eisenberg LLP

(57) ABSTRACT

An apparatus and method providing at least one input device which enables a player to deposit an amount of money into a gaming device and a memory device configured to store the deposited amount of money. The gaming device displays the deposited amount of money on a credit display. The gaming device includes a wagering game and at least one input device configured to enable the player to initiate a play of the game by inputting a wager using the deposited amount of money. The game includes a plurality of award opportunities. The gaming device determines which of the award opportunities to employ based on the deposited amount of money. In one embodiment, the gaming device provides an enhanced award opportunity if the deposited amount of money is at least a designated amount.

28 Claims, 11 Drawing Sheets

U.S. PATENT DOCUMENTS

| | | | |
|---|---|---|---|
| 4,695,053 | A | 9/1987 | Vazquez, Jr. et al. |
| 4,805,907 | A | 2/1989 | Hagiwara |
| 4,838,552 | A | 6/1989 | Hagiwara |
| 4,991,848 | A | 2/1991 | Greenwood et al. |
| 5,011,159 | A | 4/1991 | Fortunato et al. |
| 5,019,973 | A | 5/1991 | Wilcox et al. |
| 5,088,737 | A | 2/1992 | Frank et al. |
| 5,116,055 | A | 5/1992 | Tracy |
| 5,123,649 | A | 6/1992 | Tiberio |
| 5,167,413 | A | 12/1992 | Fulton |
| 5,224,706 | A | 7/1993 | Bridgeman et al. |
| 5,294,120 | A | 3/1994 | Schultz |
| 5,294,128 | A | 3/1994 | Marquez |
| 5,321,241 | A | 6/1994 | Craine |
| 5,332,076 | A | 7/1994 | Ziegert |
| 5,342,047 | A | 8/1994 | Heidel et al. |
| 5,344,144 | A | 9/1994 | Canon |
| 5,356,140 | A | 10/1994 | Dabrowski et al. |
| 5,375,830 | A | 12/1994 | Takemoto et al. |
| 5,377,973 | A | 1/1995 | Jones et al. |
| 5,397,125 | A | 3/1995 | Adams |
| 5,401,023 | A | 3/1995 | Wood |
| 5,415,404 | A | 5/1995 | Joshi et al. |
| 5,489,101 | A | 2/1996 | Moody |
| 5,511,781 | A | 4/1996 | Wood et al. |
| 5,513,102 | A | 4/1996 | Auriemma |
| 5,531,448 | A | 7/1996 | Moody |
| 5,542,669 | A | 8/1996 | Charron et al. |
| 5,570,885 | A | 11/1996 | Ornstein |
| 5,580,055 | A | 12/1996 | Hagiwara |
| 5,584,486 | A | 12/1996 | Franklin |
| 5,584,764 | A | 12/1996 | Inoue |
| 5,593,161 | A | 1/1997 | Boylan et al. |
| 5,611,535 | A | 3/1997 | Tiberio |
| 5,645,485 | A | 7/1997 | Clapper, Jr. |
| 5,657,993 | A | 8/1997 | Merlino et al. |
| 5,678,001 | A | 10/1997 | Nagel et al. |
| 5,707,285 | A | 1/1998 | Place et al. |
| 5,711,715 | A | 1/1998 | Ringo et al. |
| 5,718,431 | A | 2/1998 | Ornstein |
| 5,720,662 | A | 2/1998 | Holmes, Jr. et al. |
| 5,722,891 | A | 3/1998 | Inoue |
| 5,732,950 | A | 3/1998 | Moody |
| 5,766,074 | A | 6/1998 | Cannon et al. |
| 5,769,716 | A | 6/1998 | Saffari et al. |
| 5,770,533 | A | 6/1998 | Franchi |
| 5,772,509 | A | 6/1998 | Weiss |
| 5,775,692 | A | 7/1998 | Watts et al. |
| 5,788,573 | A | 8/1998 | Baerlocher et al. |
| 5,791,987 | A | 8/1998 | Chen et al. |
| 5,806,855 | A | 9/1998 | Cherry |
| 5,807,172 | A | 9/1998 | Piechowiak |
| 5,816,916 | A | 10/1998 | Moody |
| 5,816,918 | A | 10/1998 | Kelly et al. |
| 5,817,172 | A | 10/1998 | Yamada et al. |
| 5,823,873 | A | 10/1998 | Moody |
| 5,823,874 | A | 10/1998 | Adams |
| 5,848,932 | A | 12/1998 | Adams |
| 5,868,619 | A | 2/1999 | Wood et al. |
| 5,882,105 | A | 3/1999 | Barlow |
| 5,882,258 | A | 3/1999 | Kelly et al. |
| 5,902,184 | A | 5/1999 | Bennett |
| 5,910,048 | A | 6/1999 | Feinberg |
| 5,911,418 | A | 6/1999 | Adams |
| 5,934,672 | A | 8/1999 | Sines et al. |
| 5,947,820 | A | 9/1999 | Morro et al. |
| 5,951,397 | A | 9/1999 | Dickinson |
| 5,954,335 | A | 9/1999 | Moody |
| 5,967,893 | A | 10/1999 | Lawrence et al. |
| 5,967,896 | A | 10/1999 | Jorasch et al. |
| 5,976,016 | A | 11/1999 | Moody et al. |
| 5,980,384 | A | 11/1999 | Barrie |
| 5,984,310 | A | 11/1999 | English |
| 5,984,781 | A | 11/1999 | Sunaga |
| 5,993,316 | A | 11/1999 | Coyle et al. |
| 5,997,401 | A | 12/1999 | Crawford |
| 6,004,207 | A | 12/1999 | Wilson, Jr. et al. |
| 6,007,066 | A | 12/1999 | Moody |
| 6,007,424 | A | 12/1999 | Evers et al. |
| 6,012,720 | A | 1/2000 | Webb |
| 6,012,981 | A | 1/2000 | Fujioka et al. |
| 6,012,983 | A | 1/2000 | Walker et al. |
| 6,018,718 | A | 1/2000 | Walker et al. |
| 6,032,955 | A | 3/2000 | Luciano et al. |
| 6,038,552 | A | 3/2000 | Fleischl et al. |
| 6,056,642 | A | 5/2000 | Bennett |
| 6,062,980 | A | 5/2000 | Luciano |
| 6,062,981 | A | 5/2000 | Luciano, Jr. |
| 6,071,192 | A | 6/2000 | Weiss |
| 6,077,163 | A | 6/2000 | Walker et al. |
| 6,089,977 | A | 7/2000 | Bennett |
| 6,089,978 | A | 7/2000 | Adams |
| 6,089,980 | A | 7/2000 | Gauselmann |
| 6,093,102 | A | 7/2000 | Bennett |
| 6,098,985 | A | 8/2000 | Moody |
| 6,102,400 | A | 8/2000 | Scott et al. |
| 6,102,402 | A | 8/2000 | Scott et al. |
| 6,105,962 | A | 8/2000 | Malavazos et al. |
| 6,110,041 | A | 8/2000 | Walker et al. |
| 6,113,098 | A | 9/2000 | Adams |
| 6,120,378 | A | 9/2000 | Moody et al. |
| 6,126,165 | A | 10/2000 | Sakamoto |
| 6,126,541 | A | 10/2000 | Fuchs |
| 6,126,542 | A | 10/2000 | Fier |
| 6,129,632 | A | 10/2000 | Luciano |
| 6,132,311 | A | 10/2000 | Williams |
| 6,135,884 | A | 10/2000 | Hedrick et al. |
| 6,139,431 | A | 10/2000 | Walker et al. |
| 6,142,872 | A | 11/2000 | Walker et al. |
| 6,142,874 | A | 11/2000 | Kodachi et al. |
| 6,149,521 | A | 11/2000 | Sanduski |
| 6,155,925 | A | 12/2000 | Giobbi et al. |
| 6,158,741 | A | 12/2000 | Koelling |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,522 | B1 | 1/2001 | Walker et al. |
| 6,168,523 | B1 | 1/2001 | Piechowiak et al. |
| 6,174,233 | B1 | 1/2001 | Sunaga et al. |
| 6,174,235 | B1 | 1/2001 | Walker et al. |
| 6,179,711 | B1 | 1/2001 | Yoseloff |
| 6,186,894 | B1 | 2/2001 | Mayeroff |
| 6,190,255 | B1 | 2/2001 | Thomas et al. |
| 6,193,606 | B1 | 2/2001 | Walker et al. |
| 6,196,547 | B1 | 3/2001 | Pascal et al. |
| 6,203,429 | B1 | 3/2001 | Demar et al. |
| 6,210,277 | B1 | 4/2001 | Stefan |
| 6,213,877 | B1 | 4/2001 | Walker et al. |
| 6,217,022 | B1 | 4/2001 | Astaneha |
| 6,217,448 | B1 | 4/2001 | Olsen |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,244,957 | B1 | 6/2001 | Walker et al. |
| 6,254,482 | B1 | 7/2001 | Walker et al. |
| 6,267,671 | B1 | 7/2001 | Hogan |
| 6,270,409 | B1 | 8/2001 | Shuster |
| 6,290,603 | B1 | 9/2001 | Luciano, Jr. |
| 6,299,165 | B1 | 10/2001 | Nagano |
| 6,302,790 | B1 | 10/2001 | Brossard |
| 6,302,791 | B1 | 10/2001 | Frohm et al. |
| 6,309,299 | B1 | 10/2001 | Weiss |
| 6,312,331 | B1 | 11/2001 | Tamaki |
| 6,312,334 | B1 | 11/2001 | Yoseloff |
| 6,315,662 | B1 | 11/2001 | Jorasch et al. |
| 6,336,862 | B1 | 1/2002 | Byrne |
| 6,358,147 | B1 | 3/2002 | Jaffe et al. |
| 6,368,214 | B1 | 4/2002 | Luciano |
| 6,371,852 | B1 | 4/2002 | Acres |

6,375,569 B1 4/2002 Acres
6,375,570 B1 4/2002 Poole
6,394,902 B1 5/2002 Glavich et al.
6,413,163 B1 7/2002 Yamauchi et al.
6,419,578 B1 7/2002 Moody et al.
6,428,412 B1 8/2002 Anderson et al.
6,435,968 B1 8/2002 Torango
6,439,995 B1 8/2002 Hughs-Baird et al.
6,443,456 B1 9/2002 Gajor
6,450,884 B1 9/2002 Seelig et al.
6,468,156 B1 10/2002 Hughs-Baird et al.
6,491,584 B2 12/2002 Graham et al.
6,569,013 B1 5/2003 Taylor
6,577,733 B1 6/2003 Charrin
6,599,193 B2 7/2003 Baerlocher et al.
6,609,969 B1 8/2003 Luciano et al.
6,609,970 B1 8/2003 Juciano, Jr.
6,612,927 B1 9/2003 Slomiany et al.
6,634,942 B2 10/2003 Walker et al.
6,634,945 B2 10/2003 Glavich et al.
6,656,043 B2 12/2003 Seelig et al.
6,682,073 B2 1/2004 Bryant et al.
6,695,696 B1 2/2004 Kaminkow
6,702,675 B2 3/2004 Poole et al.
6,712,693 B1 3/2004 Hettinger
6,712,695 B2 3/2004 Mothwurf et al.
6,739,970 B2 5/2004 Luciano
6,746,016 B2 6/2004 Perrie et al.
6,758,749 B2 7/2004 Krintzman
6,764,396 B2 7/2004 Seelig et al.
6,786,824 B2 9/2004 Cannon
6,802,778 B1 10/2004 Lemay et al.
6,857,957 B2 2/2005 Marks et al.
6,884,167 B2 4/2005 Walker et al.
6,890,255 B2 5/2005 Jarvis et al.
6,960,133 B1 11/2005 Marks et al.
7,001,274 B2 2/2006 Baerlocher et al.
7,014,560 B2 3/2006 Glavich et al.
7,052,395 B2 5/2006 Glavich et al.
7,121,943 B2 10/2006 Webb et al.
7,198,569 B2 4/2007 Wolf et al.
7,229,353 B2 6/2007 Seelig
7,291,068 B2 11/2007 Bryant et al.
7,318,774 B2 1/2008 Bryant et al.
7,329,179 B2 2/2008 Baerlocher
7,357,714 B2 4/2008 Tessmer et al.
7,419,429 B2 9/2008 Taylor
2001/0018361 A1 8/2001 Acres
2001/0038178 A1 11/2001 Vancura
2001/0054794 A1 12/2001 Cole et al.
2002/0049631 A1 4/2002 Williams
2002/0077175 A1 6/2002 Jorasch et al.
2002/0082076 A1 6/2002 Roser et al.
2002/0086725 A1 7/2002 Fasbender et al.
2002/0094863 A1 7/2002 Klayh
2002/0095387 A1 7/2002 Sosa et al.
2002/0137559 A1 9/2002 Baerlocher
2002/0147040 A1 10/2002 Walker et al.
2002/0155873 A1 10/2002 Berman et al.
2002/0165023 A1 11/2002 Brosnan et al.
2002/0169021 A1 11/2002 Urie et al.
2002/0179401 A1 12/2002 Knox et al.
2002/0187827 A1 12/2002 Blankstein
2002/0193158 A1 12/2002 Weiss et al.
2003/0013516 A1 1/2003 Walker et al.
2003/0027623 A1 2/2003 Rose
2003/0054873 A1 3/2003 Peterson
2003/0060266 A1 3/2003 Baerlocher
2003/0092486 A1 5/2003 Cannon
2003/0092490 A1 5/2003 Gauselmann
2003/0119579 A1 6/2003 Walker et al.
2003/0153383 A1 8/2003 Baerlocher et al.
2003/0195031 A1 10/2003 O'Donovan et al.
2003/0199312 A1 10/2003 Walker et al.
2003/0199313 A1 10/2003 Gonen et al.
2003/0207713 A1 11/2003 Taylor
2003/0216165 A1 11/2003 Singer et al.
2003/0216169 A1 11/2003 Walker et al.
2003/0220138 A1 11/2003 Walker et al.
2004/0017043 A1 1/2004 Moody
2004/0023713 A1 2/2004 Wolf et al.
2004/0038724 A1 2/2004 Asdale
2004/0048650 A1 3/2004 Mierau et al.
2004/0162129 A1 8/2004 Nelson
2004/0204226 A1 10/2004 Foster et al.
2004/0219969 A1 11/2004 Casey et al.
2004/0242313 A1 12/2004 Munoz
2004/0242315 A1 12/2004 Paulsen et al.
2004/0254011 A1 12/2004 Muskin
2005/0009597 A1 1/2005 Daly
2005/0029745 A1 2/2005 Walker et al.
2005/0037838 A1 2/2005 Dunaevsky et al.
2005/0054429 A1 3/2005 Baerlocher et al.
2005/0059481 A1 3/2005 Joshi et al.
2005/0060050 A1 3/2005 Baerlocher
2005/0071023 A1 3/2005 Gilliland et al.
2005/0079911 A1 4/2005 Nakatsu
2005/0090306 A1 4/2005 Seelig et al.
2005/0130737 A1 6/2005 Englman et al.
2005/0176494 A1 8/2005 Thomas
2005/0202863 A1 9/2005 Macaulay
2005/0208992 A1 9/2005 Randall
2005/0215311 A1 9/2005 Hornik et al.
2005/0218590 A1 10/2005 O'Halloran et al.
2005/0233803 A1 10/2005 Yang
2005/0282615 A1 12/2005 Englman et al.
2005/0282625 A1 12/2005 Nicely
2005/0282629 A1 12/2005 Gagner
2005/0285337 A1 12/2005 Durham et al.
2006/0003834 A1 1/2006 Okada
2006/0009283 A1 1/2006 Englman et al.
2006/0009286 A1 1/2006 Durham et al.
2006/0014580 A1 1/2006 Hawthorn
2006/0025193 A1 2/2006 Gail et al.
2006/0025211 A1 2/2006 Wilday et al.
2006/0040728 A1 2/2006 Fuller
2006/0058095 A1 3/2006 Berman et al.
2006/0063580 A1 3/2006 Nguyen et al.
2006/0069619 A1 3/2006 Walker et al.
2006/0073873 A1 4/2006 Rodgers et al.
2006/0073897 A1 4/2006 Englman et al.
2006/0089195 A1 4/2006 Walker et al.
2006/0094495 A1 5/2006 Gelber et al.
2006/0142077 A1 6/2006 Miles et al.
2006/0205480 A1 9/2006 Glavich et al.
2006/0252507 A1 11/2006 Walker et al.
2006/0252515 A1 11/2006 Walker et al.
2006/0287034 A1 12/2006 Englman et al.
2007/0021182 A1 1/2007 Gauselmann
2007/0060292 A1 3/2007 Peterson
2007/0087804 A1 4/2007 Knowles et al.
2007/0135207 A1 6/2007 Tarantino
2007/0167208 A1 7/2007 Acres
2007/0287532 A1 12/2007 Jackson
2008/0076503 A1 3/2008 Mattice et al.

FOREIGN PATENT DOCUMENTS

AU 200245837 12/2002
DE 3105266 9/1982
EP 0 558 307 A2 2/1993
EP 0 753 331 A2 1/1997
EP 0 874 337 A1 10/1998
EP 0 945 837 A2 9/1999
EP 0 981 119 A2 2/2000
EP 0 984 407 A2 3/2000
EP 0 989 531 A2 3/2000
EP 1 076 321 A1 2/2001
EP 1 195 730 A2 4/2002
EP 1 589 501 A1 11/2004
EP 1 536 388 A1 1/2005
EP 1 513 114 A2 3/2005
EP 1 580 701 A2 3/2005
GB 0 970 806 9/1964
GB 2 137 392 A 10/1984
GB 2 292 245 2/1996
GB 2 322 217 A 8/1998
GB 2 382 911 6/2003
GB 2 387 950 A 10/2003

| | | |
|---|---|---|
| WO | WO 85/00910 | 2/1985 |
| WO | WO 98/00207 | 1/1998 |
| WO | WO 99/03078 | 1/1999 |
| WO | WO 02/078804 | 10/2002 |
| WO | WO 03/026757 | 4/2003 |
| WO | WO 2005/010831 | 3/2005 |
| WO | WO 2005/077480 | 8/2005 |
| WO | WO 2005/083599 | 9/2005 |
| WO | WO 2006/002241 | 1/2006 |
| WO | WO 2006/004831 | 1/2006 |
| WO | WO 2006/015442 | 2/2006 |
| WO | WO 2006/017431 | 2/2006 |
| WO | WO 2007/090270 | 8/2007 |

OTHER PUBLICATIONS

"About Empire Poker" by FlopTrips.com, Jan. 2, 2006 <http://web.archive.org/web/20060102212946/http://www.floptrips.com/empirepokerdepositbonus.html>.
"Exciting New Online Game," InterCasino Digest, Apr. 1999, 2 pgs.
"FrequentFlier.com—A weekly summary of travel news & opinion" (http://www.frequentflier.com/ffc-0729.htm), Jul. 29, 1999, Issue #52, 9 pgs.
"Harrah's courts frequent gamblers with 'total gold,'" New Orleans CityBusiness, Nov. 8, 1999, Section: vol. 20, No. 20, p. 1, ISSN: 02794527, 3 pgs.
3RV—Jackpot Party Advertisement written by WMS Gaming, Inc., published Aug. 8, 2002.
Big Times Red, White & Blue Advertisement written by IGT, published in 2005.
Bunco History and Rules, printed from http://world-bunco.com/history.html on May 22, 2000.
Creepy and Kooky Article, written by Frank Legato, published by Strictly Slots in Jul. 2000, pp. 52-54.
Jackpot Party Advertisement on website page http://www.wmsgaming.com/products/slot/jpp/index.html, printed on Mar. 21, 2001.
Jackpot Party Brochures and Articles written by WMS Gaming, Inc., published in Mar. 1998.
Jackpot Party Video 9-Line Advertisement written by WMS Gaming, Inc., available prior to Oct. 30, 2006.
Jeopardy Advertisement written by IGT, published in 2000.
Jeopardy Video Slots advertisement written by IGT, published in 2000.
Jeopardy, MegaJackpots Advertisement written by IGT, published in 1998.
Monopoly Blackjack Edition Game described in Mikohn brochure, published in 2000.
Multi-Action Blackjack brochure, http://conjelco.com/faq/bj.html, printed on Jul. 30, 2001.
Multi-Play Poker by Bally Gaming, described in Strictly Slots, published in Dec. 2000.
Multi-Play Poker by Bally Gaming, printed from ballygaming.com/products/multi-play-poker.html on Apr. 25, 2001.
Play It Again Poker Brochure, written by IGT, published in 1999.
Power Slotto Brochure published by AC Coin & Slot prior to 2002.
Slot Machines, A Pictorial History of the First 100 Years, written by Marshall fey, published by Liberty Belle Books, 1983-1997.
Slots 2003 Article written by Melissa Raimondi, published in Jan. 2003.
Stratton, David, "Join the Club; casinos start 'slot clubs,'" Travel Agent, Sep. 10, 2001, Section: No. 7, vol. 305, pp. 95, 1053-9360, 3 pgs.
Super Bonus Poker by Bally Gaming, described in Strictly Slots, published in Apr. 2000.
Super Times Pay Poker Advertisement, written by IGT, published in 2003.
Totem Pole Advertisement, written by IGT, published in 1997.
Turboreel Advertisement, written by Barcrest, available prior to Oct. 30, 2006 (with English Translation).
We Make Gaming Fun! Advertisement written by WMS Gaming Inc., available prior to Oct. 30, 2006.
Website: "First National Bank and Trust—Personal," (http://www.agbank.com.personal.cfm), download date Aug. 6, 2003, 6 pgs.
Wheel of Madness Game, described in AC Coin & Slot brochure, published in 2000.

PAYTABLE A

PAYTABLE B

FIG. 5A

PAYTABLE C

98c

| Winning Symbol Combination (100) | Award (102) |
|---|---|
| AAA | 450 |
| BBB | 200 |
| CCC | 100 |
| DDD | 50 |
| EEE | 25 |

Average Expected Payout = 165

FIG. 5B

PAYTABLE D

98d

| Winning Symbol Combination (100) | Award (102) |
|---|---|
| AAA | 600 |
| BBB | 500 |
| CCC | 250 |
| DDD | 100 |
| EEE | 50 |

Average Expected Payout = 300

GAMING SYSTEM AND METHOD FOR PROVIDING ENHANCED PLAYER OPPORTUNITIES FOR DEPOSITING MONETARY AMOUNTS ABOVE A DESIGNATED LEVEL

PRIORITY CLAIM

This application is a continuation of, and claims priority to and the benefit of, U.S. patent application Ser. No. 11/554,489, filed on Oct. 30, 2006, which issued as U.S. Pat. No. 8,235,801 on Aug. 7, 2012, the entire contents of which are incorporated herein by reference.

CROSS REFERENCE TO RELATED APPLICATION

This application is related to the following commonly owned co-pending patent application: U.S. patent application Ser. No. 10/419,306.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to deposit funds into the gaming machine and place or make a wager using some or all of those deposited funds to activate the primary or base game. In many of these gaming machines, the award is provided to the player if the player obtains a winning symbol or winning symbol combination and is based on the amount of the wager (i.e., the higher the wager, the higher the award). Symbols or symbol combinations which are less likely to occur usually provide higher awards. The awards provided to the players for winning symbols or winning symbol combinations are generally part of the paytable or paytables for the gaming machine.

In such known gaming machines, the amount of the wager made on the base game by the player may vary. For instance, the gaming machine may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game enables the player to make a wager on each payline in a single play of the primary game. Slot games with 1, 3, 5, 9, 15, and 25 lines are widely commercially available. Thus, it is known that a gaming machine, such as a slot game, enables players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously.

It should be appreciated that different players play at substantially different wagering amounts or levels and at substantially different rates of play.

Secondary or bonus games are also known in gaming machines. These secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game of the gaming machine. For instance, a bonus symbol occurring on a payline on the third reel of a three reel slot machine may trigger the secondary bonus game on that gaming device. Part of the enjoyment and excitement of playing certain gaming machines is the occurrence or triggering of the secondary or bonus game (even before the player knows how much the bonus award will be).

To increase player enjoyment and excitement gaming device manufacturers constantly strive to provide players with new types of gaming machines or enhancements to existing gaming machines that attract the player and keep the player entertained.

One proven way manufacturers use to make their gaming machines more popular is to increase the number and variety of winning combinations and provide more opportunities for the player to win. Providing more opportunities to win holds the player's interest for a longer time and also enables the manufacturer to have a larger range of payouts for the winning combinations. The larger range of payouts increases the size of the largest possible payout of the gaming device, and larger payouts tend to attract players.

One avenue that manufacturers have taken to provide more variety, opportunity, enjoyment and excitement has been to increase the number of paylines. Paylines are the lines of symbol positions or paystops that the gaming machine analyzes to determine if the player has won an award. Original gaming machines had only one payline. Modern machines, sometimes called "line" machines, have multiple paylines that form combinations of reel symbols for the gaming device to analyze.

Multiple paylines present multiple opportunities for the player to obtain a winning combination of symbols. Usually, players have to wager more to obtain the benefit of the multiple lines. Many games provide a bonus jackpot for playing the maximum number paylines ("max lines") and/or the maximum number of credits or coins per payline ("max coins"). Many existing gaming machines that have bonus games also require that the player wager a designate amount of credits to be eligible for or to qualify for the bonus game or a jackpot. Other slot machines require a player to wager a designated amount such as the highest possible number of credits on each of the paylines, or such as at least one coin per payline, before the game enables the player to win a predetermined award from a game of the gaming device.

At least one known slot machine increases the player's odds of winning a jackpot based upon the number of coins or credits played. Another known gaming system has a system separate and apart from the normal operation of the game of the slot machine for adjusting the odds based upon the amount of the player's wager. The system makes a separate evaluation based solely on the number of coins wagered by the player to determine whether the player is eligible to win a jackpot. For example, if the player bets one coin, the system maintains a 1/10,000 chance that the player will be eligible to play for the jackpot, whereby if the player bets forty-five coins, the system maintains a 45/10,000 chance that the player will be eligible for the jackpot.

Several known gaming machines provide players with opportunities to obtain certain game enhancements in exchange for placing additional wagers. One such gaming device is described in U.S. Patent Publication 2005/0215311 to Hornick et al. The Hornick gaming device includes a wagering game having interactive pop-up windows which display sets of available game enhancement parameters, such as additional bonus-triggering outcomes and enhanced awards during the bonus game. The player utilizes the interactive pop-up windows to place side bets or additional wagers. In response to a player input of a side bet, the gaming device provides at least one of the available game enhancements to the player.

As noted above, several known gaming devices employ or carry out a determination based on the amount of the player's wager. However, some players do not wish to wager the required amount to qualify for certain game enhancements or award opportunities, such as a predetermined award, a jackpot award, or the chance to participate in a bonus game.

It would be advantageous to provide gaming systems that enable any player to be eligible for game enhancements or enhanced award opportunities, regardless of the amount wagered.

SUMMARY

The present disclosure relates in general to gaming systems, gaming devices, and methods, and more particularly to gaming systems, gaming devices, and methods providing enhanced player opportunities for depositing monetary amounts through a gaming system or onto a gaming device at or above a designated level. The present disclosure can be applied to a stand alone gaming machine, a gaming machine on a gaming system, or other suitable gaming system, such as one accessed through a data network, such as the internet. Various embodiments are discussed herein in relation to a gaming device, however, it should be appreciated that these embodiments can be implemented in any suitable manner. Thus, the gaming device could be any suitable device that provides the methods disclosed herein through a data network, such as the internet.

In one embodiment, the gaming device includes at least one input device which enables a player to deposit an amount of money and a memory device configured to store the deposited amount of money (such as by storing data representing said deposited amount of money). The gaming device displays the amount of money deposited by the player on a credit meter or display. The gaming device includes at least one game operable upon a wager and at least one input device for enabling the player to initiate a play of the game by placing the wager using a portion of or all of the deposited funds or money. Thus, it should be appreciated that the amounts deposited by a player are held by the gaming machine for the player to wager for the player to obtain by cashing out. The game includes a plurality of different award opportunities. The gaming device determines which of the award opportunities will be employed in the game based on the amount of money deposited by the player. The gaming device provides one or more better or enhanced award opportunities if the amount of money deposited by the player is at or above a designated level.

The enhanced award opportunity may relate to any suitable function or characteristic of a primary or base game, or a bonus or secondary game. For example, the enhanced award opportunity may include one of a plurality of different paytables employed in a game or eligibility to play for a jackpot award.

In one embodiment, the game is a known wagering game which is operable to provide one or more awards to a player, such as, but not limited to, slot, poker, keno, bingo, craps, blackjack, bunco, or any combination thereof. It should be appreciated that the game may be any suitable game that is operable upon a wager by a player and that is operable to provide an award to the player. In another embodiment, the game is a secondary or bonus game.

In one embodiment, the credit meter stores a sufficient amount of money to enable the player to make wagers on and play several iterations of the game. In other words, the deposited amount of money lasts for multiple bets. The credit meter accumulates and displays any awards or credits won by the player during the game in addition to the monetary amount deposited by the player less the amounts wagered by the player. In one embodiment, when the player wishes to stop playing, the gaming device provides a cash out mechanism by which the player retrieves some or all of the amount of funds deposited into the gaming device and any amounts won using those deposited funds less amounts wagered by the player. It should be appreciated that the player may cash out at any time between game plays to retrieve deposited funds.

In one embodiment, after the player deposits an amount of money into or onto the gaming device, the gaming device determines whether the deposited amount of money is at or above a designated amount of money. The gaming device enables the player to initiate a play of a game by wagering a portion of the deposited funds (or funds won using those deposited funds). If the amount of money deposited by the player is not at or above the designated amount of money, the gaming device provides the player with a first award opportunity. If the deposited amount of money is at or above the designated amount, the gaming device provides the player with a second different award opportunity. In one embodiment, the second award opportunity is better than the first award opportunity. In this embodiment, the second award opportunity is better than the first award opportunity because it provides the player with an advantage in the game.

In one embodiment, if the player deposits an amount of money which is at or above the designated amount, the gaming device applies the second award opportunity to each iteration of the game wagered-on using those deposited funds. In another embodiment, if the player deposits an amount of money which is at or above the designated amount, the gaming device applies the second different award opportunity to at least one and preferably a plurality of iterations of the game wagered-on using the deposited funds.

In one embodiment, the gaming device provides a plurality of different paytables associated with the game, including at least a first paytable and a second different paytable. Each of the paytables has an average expected payout. The gaming device enables the player to deposit an amount of money into the gaming device. The gaming device enables the player to make a wager using the deposited funds to initiate a play of the game. The gaming device determines whether the amount of money deposited by the player is at or above a designated amount of money. If the gaming device determines that the amount of money deposited by the player is not at or above the designated amount of money, the gaming device determines a game outcome based on a first one of the paytables. If the gaming device determines that the amount of money deposited by the player is at or above the designated amount of money, the gaming device determines a game outcome based on a second better and different one of the paytables.

In one embodiment, the second paytable has an average expected payout that is higher than the average expected payout of the first paytable. In this embodiment, if the amount of money deposited by the player is at or above the designated amount, the gaming device determines an award based on the second paytable (that has a higher average expected payout than the first paytable). Thus, depositing an amount of money that is at or above the designated amount gives the player an advantage in the game.

In one embodiment, a plurality of the paytables associated with the game have different average expected payouts, wherein some paytables, on average, result in higher average payouts than other paytables. In one embodiment, a plurality of the paytables have different volatilities. The volatility pertains to the range of the values of the awards in the paytable. In one embodiment, one paytable may include higher and lower award values than another paytable having substantially the same average expected payout.

For example, a first paytable having a first average expected payout provides awards of a smaller or moderate size but does so on a relatively frequent basis. A second paytable with an average expected value equal or substantially equal to the first average expected payout, includes higher awards that are provided less frequently. Although the first and second paytables have equal or substantially equal average expected payouts, the award disparity in the second paytable creates enhanced levels of excitement for a player because the player has the opportunity to obtain a large award by playing with the more volatile second paytable.

In another embodiment, the gaming device enables the player to deposit a first amount of money into or onto the gaming device. The gaming device determines whether the first amount deposited is at or above a designated amount of money. If the first amount of money deposited by the player is not at or above the designated amount, the gaming device informs the player that the player may deposit an additional amount of money, such as by displaying an audio, visual, or audiovisual message. The gaming device determines whether the player has deposited the additional amount of money. If the first amount of money deposited by the player in combination with the additional amount deposited by the player is at or above the designated amount of money, the gaming device provides an enhanced award opportunity to the player. If the player does not deposit the additional amount of money, the gaming device provides a first award opportunity to the player.

In different embodiments, the gaming system enables the player to maintain an account such as via a player tracking system or through a suitable data network, such as the Internet. In one embodiment, the player sets up an account and supplies suitable account information. The player causes an amount of money to be deposited into or onto the account. The gaming device enables the player to use money stored in the account to fund play on the gaming device. The account enables the player to keep a balance of money deposited and money won during the game using stored funds.

In one embodiment, the player maintains an account on a gaming server in communication with the gaming device. In this embodiment, a player deposits an amount of money with the gaming server. In one example embodiment, the player deposits an amount of money directly with the gaming server via a credit or debit card. Once the credit or debit card information is approved or verified, the deposited amounts of money are available for wagering activity. Wagers are subsequently deducted from the deposited amount of money to play on the gaming device.

In another embodiment, the player maintains a separate account, wherein money from the separate account is transferred to the gaming system upon a suitable request to transfer funds by the player. In one such embodiment, the account is remote from the gaming system. In one embodiment, a player requests a desired amount of funds to be transferred from a remote third-party institution or fund repository to the gaming system. The requested funds transfer is then approved or verified by the third-party institution, transferred to the gaming system, and converted to credits or deposit amounts for future play or wagering activity. The present disclosure provides a reward to players who deposit more money and reduces or eliminates delay associated with verifying funds.

It is therefore an advantage of the present disclosure to provide a gaming device wherein the amount of money deposited by a player determines one or more of the award opportunities employed in a wagering game.

Another advantage of the present disclosure is to provide a gaming device which enables a player to deposit a designated amount of money to obtain enhanced award opportunities in a wagering game.

Another advantage of the present disclosure is to provide a gaming device wherein a player may discontinue game play at any time during the game to retrieve some or all of the amount of funds deposited and any amounts won using those deposited funds.

It should be appreciated that the present invention may be employed in connection with a primary or base wagering game, a secondary or bonus game, or any suitable combination thereof.

Additional features and advantages of the present disclosure are described in, and will be apparent from, the following Detailed Description and the figures.

BRIEF DESCRIPTION OF THE DRAWINGS

FIGS. 5A and 5B are schematic views of example paytables of one embodiment of the present disclosure, wherein each paytable has an average expected payout.

DETAILED DESCRIPTION

Gaming Device and Electronics

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
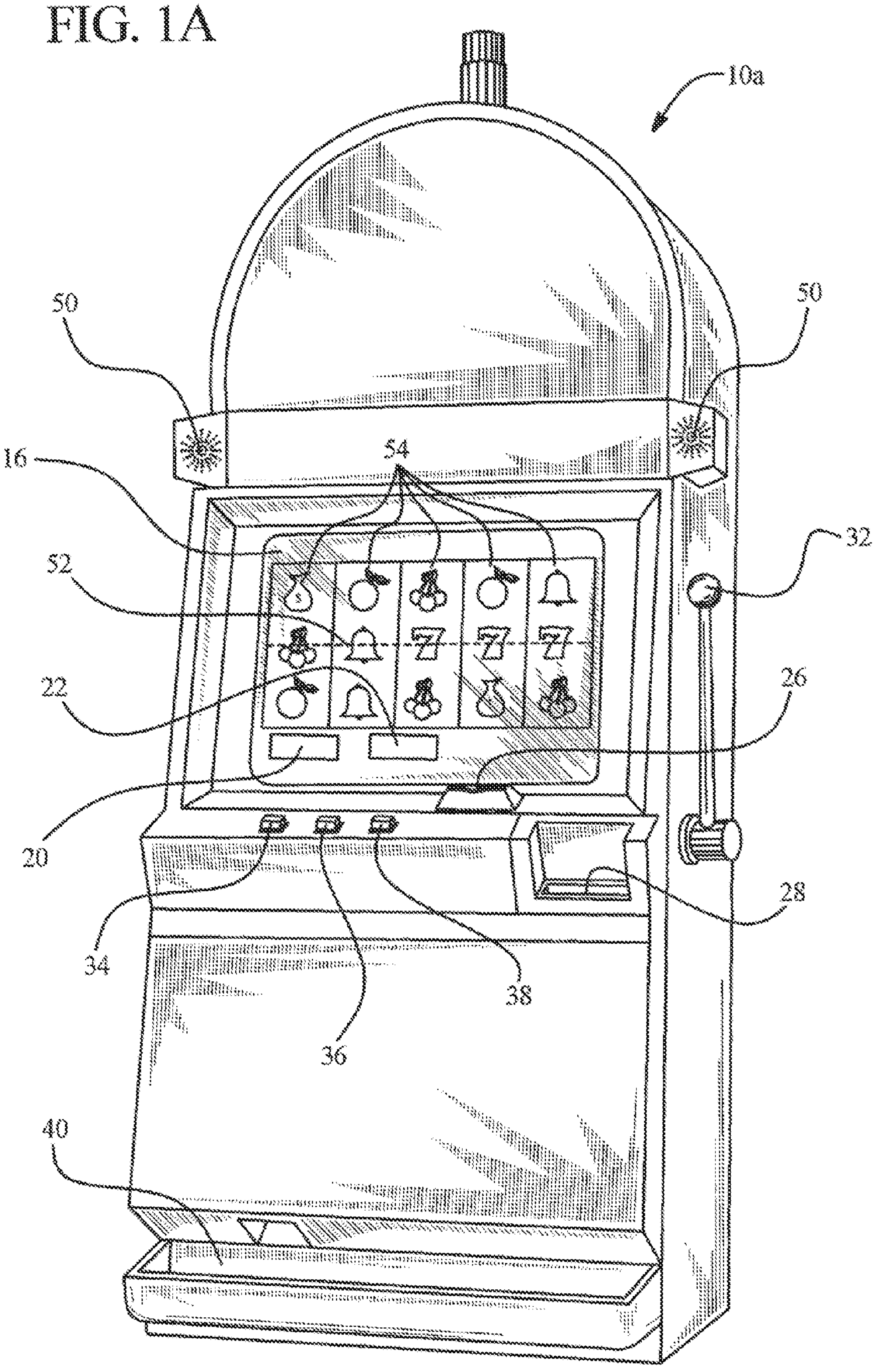
FIGS. 1A and 1B are perspective views of example alternative embodiments of the gaming device of the present disclosure.
Figure 1B:
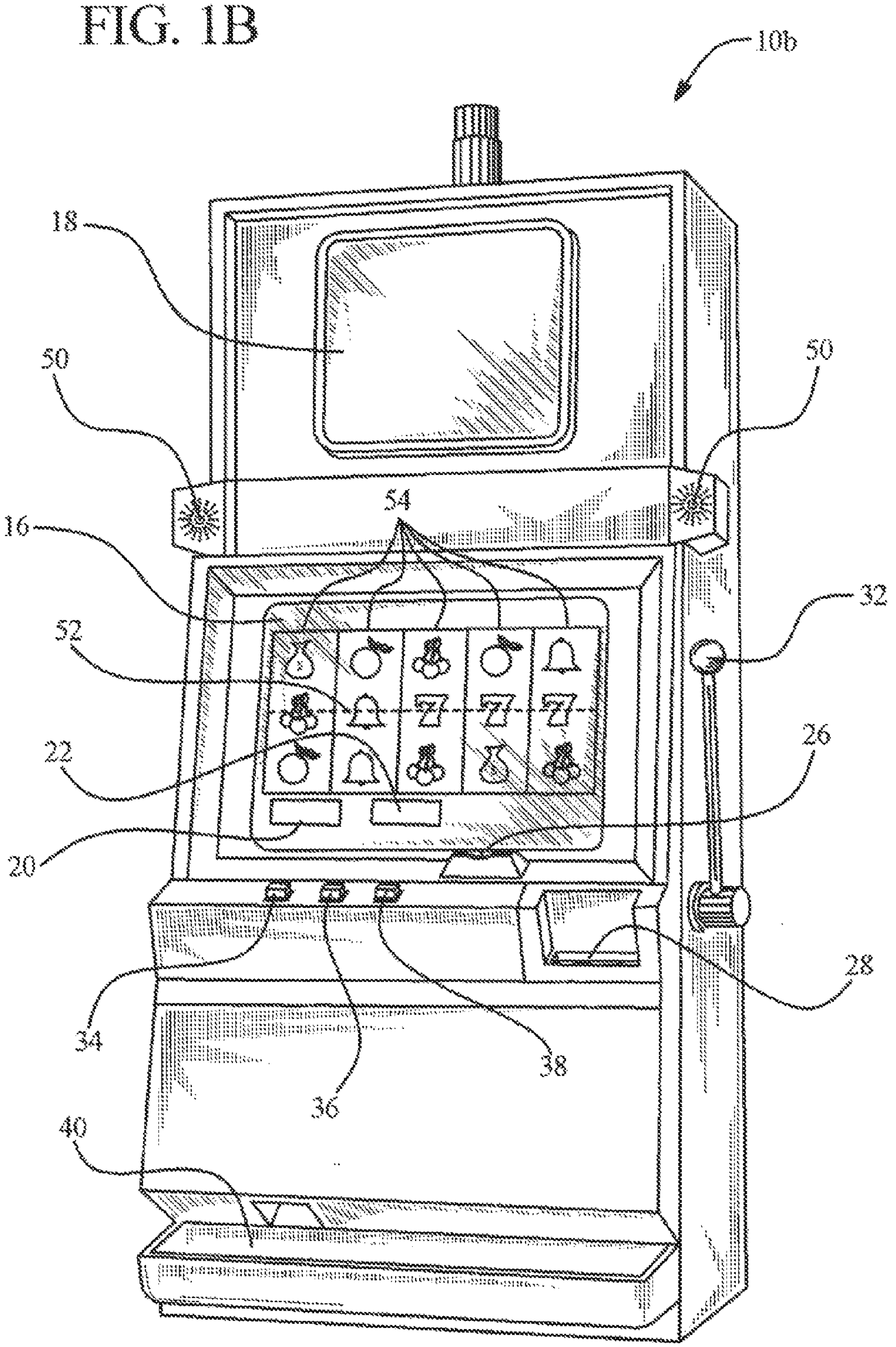

Referring now to the drawings, two alternative embodiments of the gaming device are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B the gaming device may have varying cabinet and display configurations.

Figure 2A:
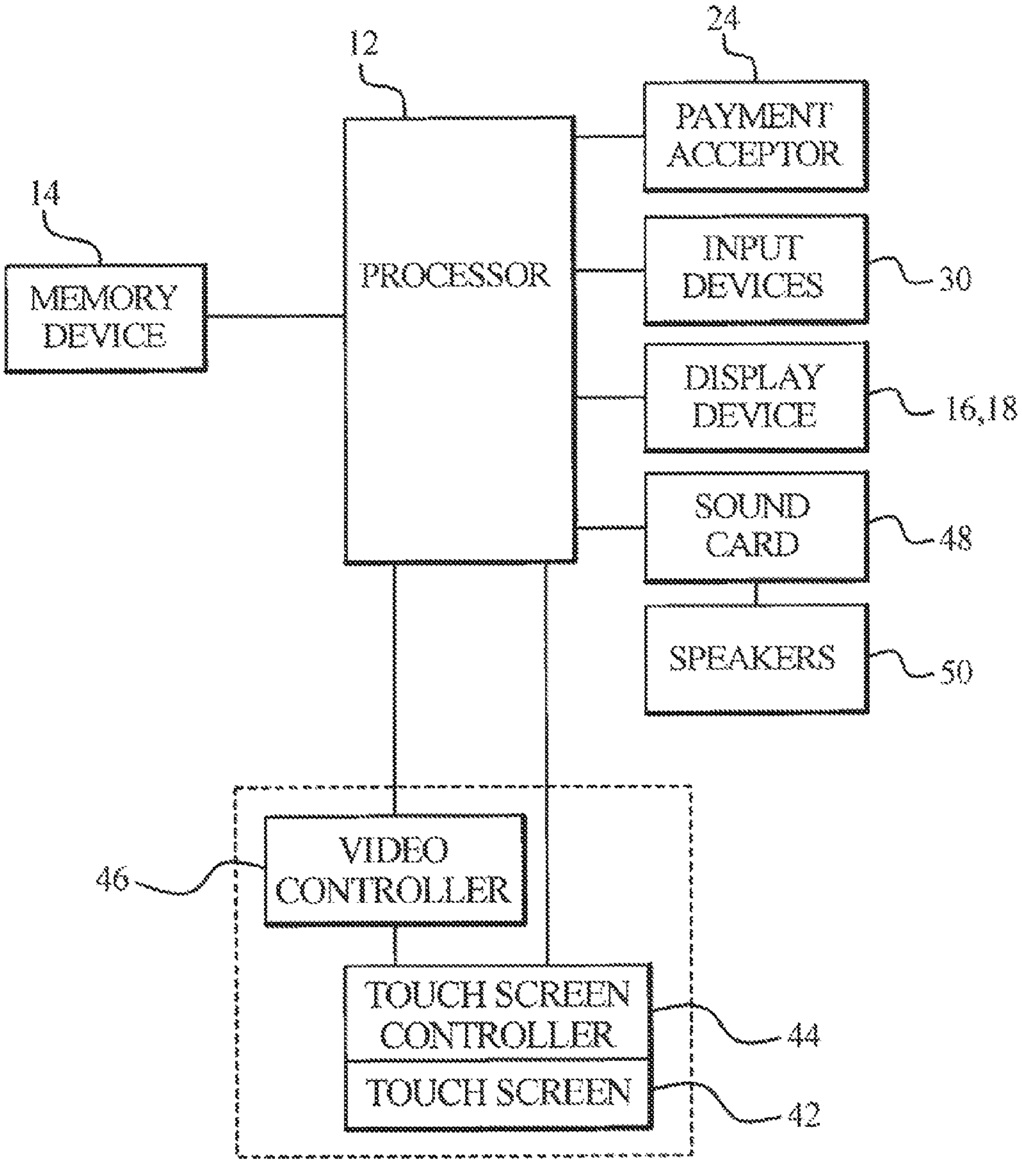
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, paytable data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG) or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B include a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 1A and 1B in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with en associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, as illustrated in FIGS. 1A and 1B a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

Figure 2B:
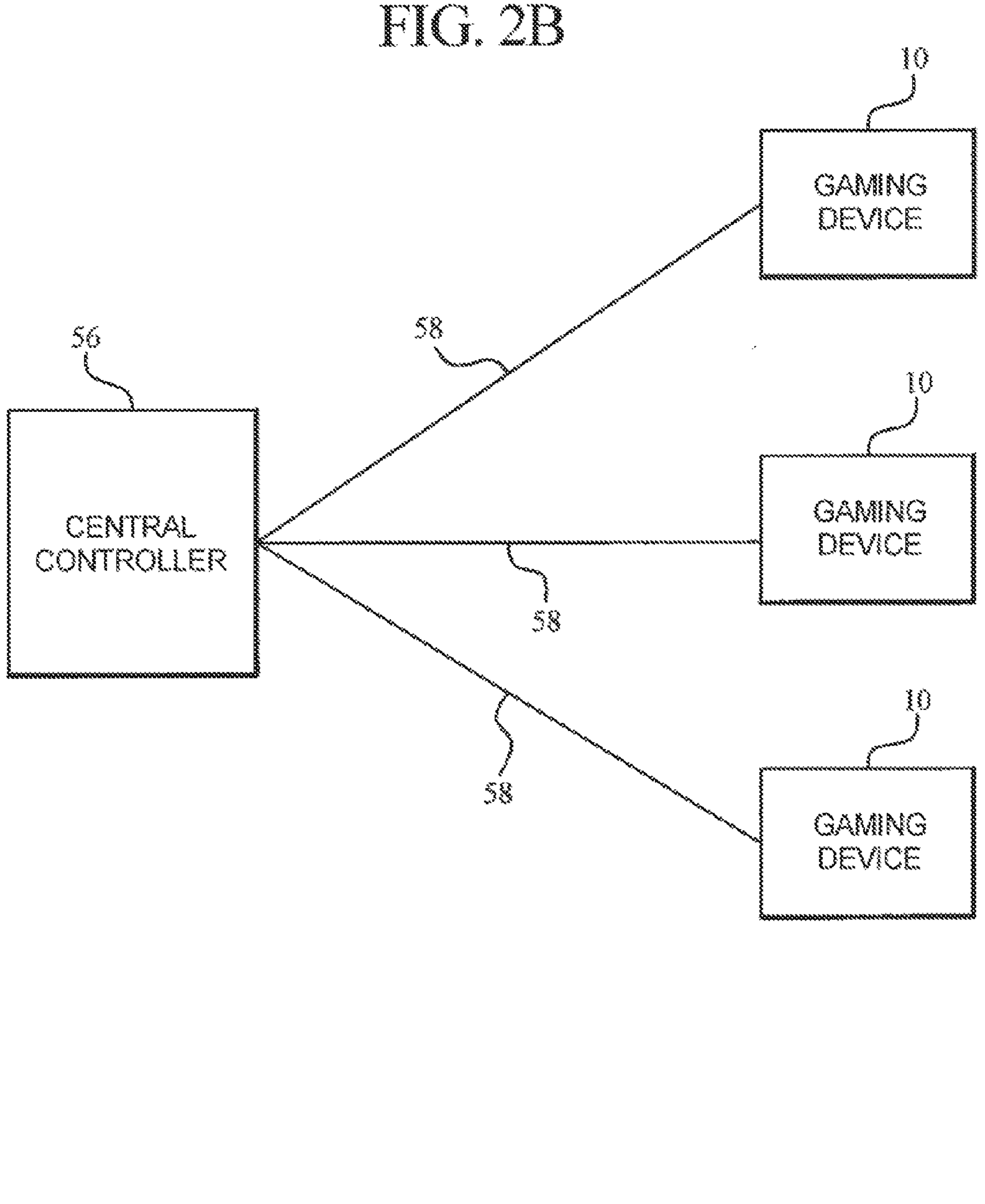
FIG. 2B is a schematic block diagram of one embodiment of a network configuration for a plurality of gaming devices disclosed herein.

In one embodiment, as illustrated in FIG. 2B, one or more of the gaming devices 10 may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a "daub" button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an Internet or intranet. In this embodiment, the operation of the gaming device can be viewed at the gaming device with at least one Internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a "chip" to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to a central server a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer. In one embodiment, an individual gaming machine may trigger a progressive win, for example through a game play event such as a symbol-driven trigger. In one embodiment, the central server or other central controller determines when a progressive win is triggered. In one embodiment, a central controller and an individual gaming machine work in conjunction with each other to determine when a progressive win is triggered, for example through an individual gaming machine meeting a predetermined requirement established by the central controller.

Figure 3:
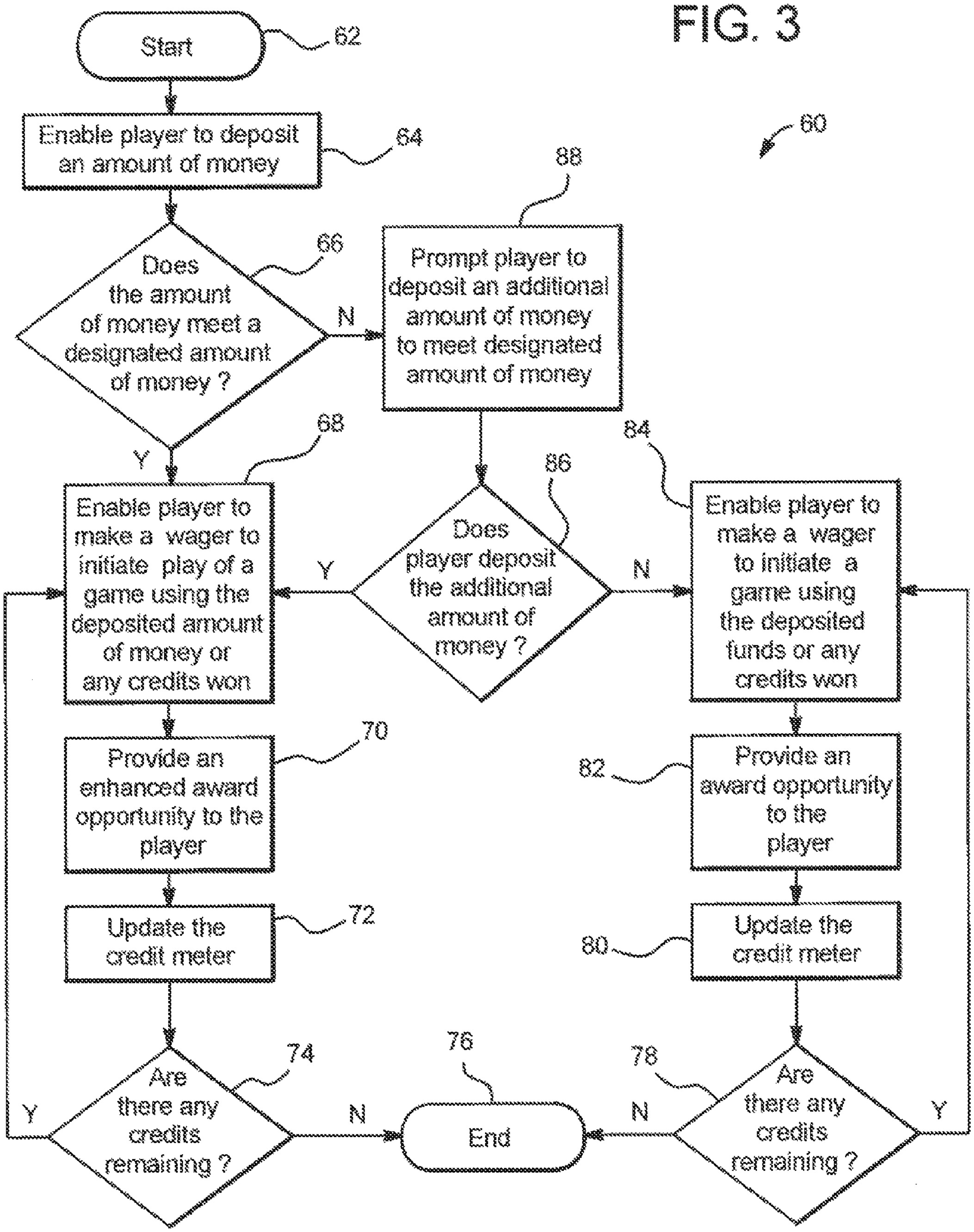
FIG. 3 is a process flow diagram showing one possible flow sequence of one embodiment of the present disclosure.

Enhanced Player Opportunities for Depositing Monetary Amounts Above a Designated Level Referring now to FIG. 3, one embodiment the present disclosure operates according to sequence 60. Sequence 60 starts as indicated in oval 62.

The gaming device 10 enables a player to deposit an amount of money as indicated in block 64. In one embodiment, when a player deposits funds, the gaming device 10 determines the amount of funds inserted and displays the amount on a credit meter or other suitable display.

The gaming device 10 determines whether the deposited amount of money is at or above a designated amount of money as indicated in decision diamond 66. If the gaming device determines that the deposited amount of money is at or above the designated amount of money, the gaming device 10 enables the player to make wager a portion of the deposited funds to initiate a play of a game as indicated in block 68.

If the gaming device 10 determines that the deposited amount of money is not at or above the designated amount of money, the gaming device informs the player that the player may deposit an additional amount of money to meet the designated amount of money as indicated in block 88.

After informing the player that the player may insert the additional amount of money, the gaming device determines whether the player has deposited the additional amount of money as indicated in decision diamond 86. If the gaming device determines that the player has deposited the additional amount of money, and thereby meets the designated amount, the gaming device 10 enables the player to make wager a portion of the deposited funds to initiate a play of a game as indicated in block 68.

Upon receiving the player's wager, the gaming device provides an enhanced award opportunity to the player as indicated in block 70.

As indicated in block 72, the gaming device updates the credit meter to reflect the credits won by the player, if any. The gaming device determines whether there are any credits remaining as indicated in decision diamond 74. If the gaming device 10 determines that there are credits remaining, the gaming device repeats the process starting at block 68. Therefore, the player has the opportunity to wager another amount to initiate another play of the game. If the gaming device 10 determines that there are no credits remaining, the game ends as indicated in oval 76.

If the gaming device determines that the player has chosen not to deposit the additional amount of money, and therefore, the amount of money deposited is not at or above the designated amount of money, the gaming device enables the player to make a wager to initiate the game using a portion of the deposited funds as indicated in block 84.

Upon receiving the player's wager, the gaming device provides an award opportunity to the player as indicated in block 82.

As indicated in block 80, the gaming device updates the credit meter to reflect any credits won by the player in the award opportunity. The gaming device 10 determines whether there are any credits remaining as indicated in decision diamond 78. If the gaming device 10 determines that there are credits remaining, the gaming device 10 repeats the process starting at block 84. The player, therefore, has the opportunity to place another wager to initiate another play of the game.

It should be appreciated that, if the gaming device 10 determines that the additional amount of money was not deposited (i.e., the total amount of money deposited is not at or above the designated amount of money), the player only obtains the award opportunity, as indicated by block 84. On the other hand, if the gaming device 10 determines that the additional amount of money was deposited (i.e., the total amount of money deposited is at or above the designated amount of money), the player receives an enhanced award opportunity, as indicated by block 72.

In one embodiment, once the gaming device determines that the deposited amount of money is at or above the designated amount (i.e., the player qualifies to receive the better or enhanced award opportunity), the gaming device provides the enhanced award opportunity for each play of the game wagered on using those deposited funds. In another embodiment, if the gaming device determines that the amount of money is at or above the designated amount of money, the gaming device applies the enhanced award opportunity to a number of plays of the game that is randomly determined, predetermined, or determined in any other suitable manner.

In one embodiment, the gaming device enables the player to deposit more money after each play of the game to qualify for an enhanced award opportunity. In another embodiment, the gaming device enables the player to deposit more money at any time or at one or more designated times to qualify for an enhanced award opportunity. For example, in certain embodiments, the gaming device identifies a player, such as via a player tracking system, and the player is limited to depositing more money to obtain the enhanced award opportunity once a day, once an hour, or any other suitable time interval.

It should be appreciated that in certain embodiments, the player may cash out any credits and discontinue gaming at any point during sequence 60 between game play.

Figure 4A:
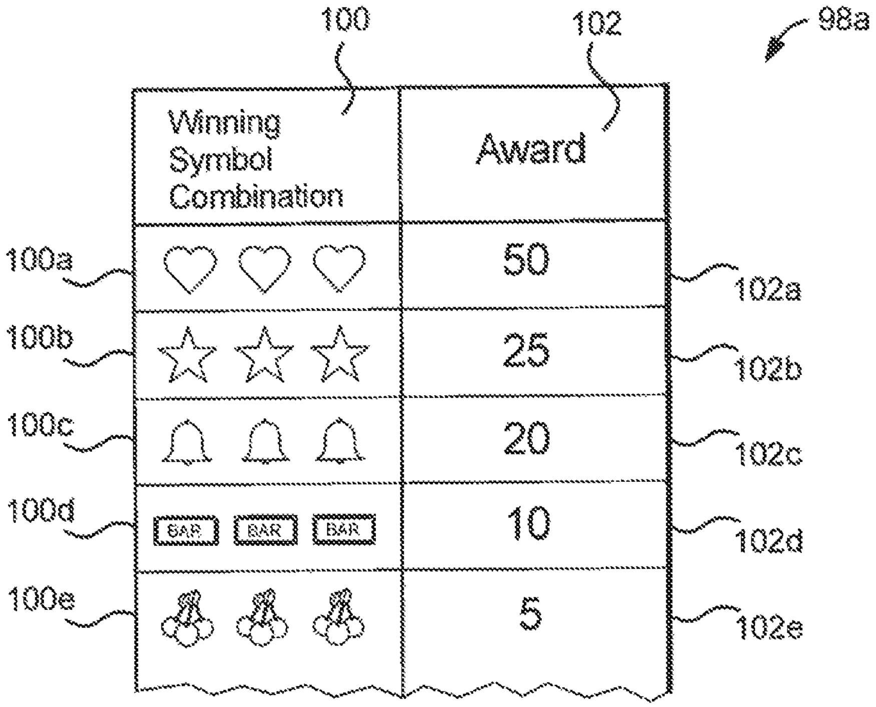
FIGS. 4A and 4B are schematic views of two example paytables of one embodiment of the present disclosure, which display a sampling of the different payout amounts for each paytable.
Figure 4B:
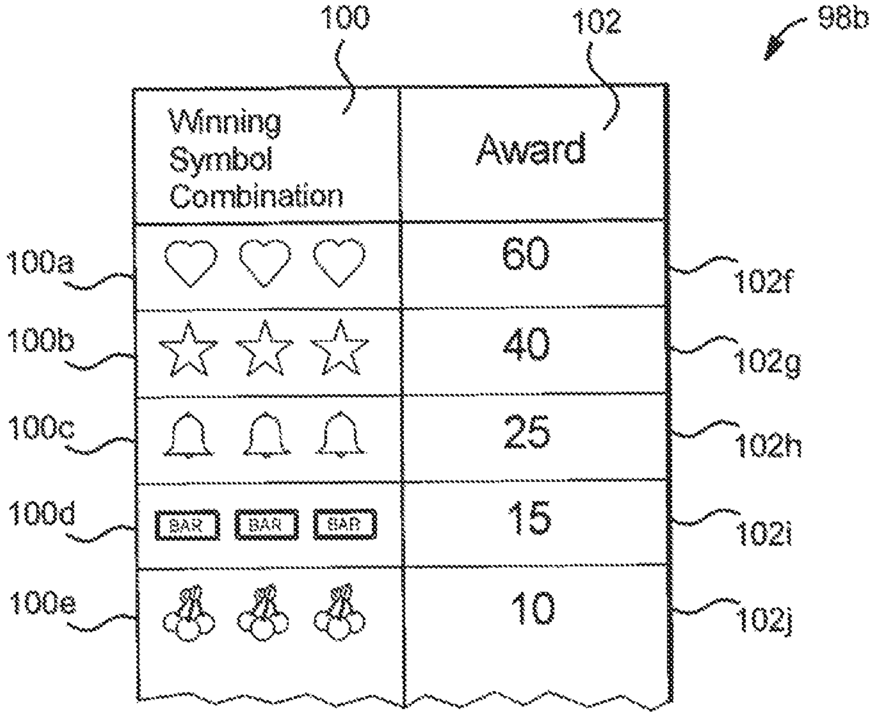

Referring now to FIGS. 4A and 4B, one example embodiment of the present disclosure includes a plurality of different paytables including: Paytable A 98*a* and Paytable B 98*b*. Each paytable includes symbols or symbol combinations 100 that produce respective awards 102 for the player. For illustration purposes, FIGS. 4A and 4B display a sampling of the different winning symbol combinations and do not show losing or non-winning outcomes or other potential winning outcomes.

It should be appreciated that a paytable can have any suitable number of winning symbols or symbol combinations. In various embodiments, (a) a plurality of the paytables have the same number of symbols, (b) a plurality of the paytables have a different number of symbols, (c) a plurality of the paytables have the same type of symbols, (d) a plurality of the paytables have different types of symbols, and (e) a plurality of the paytables have both a different number of symbols and different types of symbols.

As shown in FIGS. 4A and 4B, Paytable A 98*a* includes 5 winning symbols or symbol combinations, Paytable B 98*b* also includes 5 winning symbols or symbol combinations. For example, the five possible winning symbol combinations 100 of Paytable A 98*a* correspond to awards of 50, 25, 20, 10, and 5 (102*a* to 102*e*) times the amount of the player's wager, Paytable B 98*b* includes awards for the same 5 winning symbols combinations that exist in Paytable A 98*a*. However, the same winning symbol combinations in Paytable B 98*b* correspond to awards having higher values than the awards in Paytable A 98*a* (i.e., the winning symbol combinations 100 of Paytable B 98*b* correspond to awards of 60, 40, 25, 15, and 10 (102*f* to 102*j*) times the amount of the player's wager).

In one embodiment, the gaming device provides to the player an enhanced paytable, such as Paytable B 98*b*, for depositing an amount of money that is at or above a designated amount. A game employing Paytable B 98*b* provides the player with the opportunity to win higher awards than Paytable A 98*a*. In certain embodiments, the higher awards may be conventional awards with a higher value than any of the other awards. The higher awards may also be jackpot awards, progressive awards, free games or activations, physical prizes such as a new automobile, or any other suitable award or combination of awards.

Referring now to FIGS. 5A and 5B, one example embodiment of the present disclosure includes a plurality of different paytables includes: Paytable C 98*c* and Paytable 98*d*. As shown in FIGS. 5A and 5B, Paytable C 98*c* and Paytable D 98*d* have different average expected payouts.

The symbols or symbol combinations 100, their respective awards 102, and the chance of said symbols or symbol combinations occurring (not shown) of each of Paytable C 98*c* and Paytable t 98*d* determine the average expected payout for that paytable. In one embodiment of the present disclosure, a plurality of the paytables have different average expected payouts. In one embodiment, each of the paytables has a different average expected payout. In another embodiment, a plurality of the paytables have the same average expected payouts. In another embodiment, each of the paytables has the same average expected payout.

In one embodiment, a plurality of the paytables have different volatilities. In another embodiment, each of the paytables have different volatilities. Volatility pertains to the range of the values of the awards. For example, the lowest award for Paytable C 98*c* is 25. The highest award for Paytable C 98*c* is 450. Thus, the awards in Paytable C 98*c* have a volatility range of 425 between the lowest possible award and the highest possible award. In this example, each of the awards in Paytable C 98*c* have the same probability of being generated. Therefore, the average expected payout is 165 for each of the five awards.

Paytable D 98*d* has a volatility range of 550 (600−50) and an average expected payout for each of the five wins of 300 ((600+500+250+100+50)/5). Thus, in FIGS. 5A and 5B, Paytable D 98*d* has greater volatility than Paytable C 98*c*. That is, the range of possible awards in Paytable t 98*d* is greater than the range of possible awards in Paytable C 98*c* (i.e., the awards in Paytable 98*d* have a volatility range of 550 between the lowest possible award and the highest possible award). In this example, each of the paytables has a different volatility and a different average expected payout. In another embodiment, a plurality of the paytables have the same volatility. In another embodiment, each of the paytables have the same volatility.

As discussed above, in one embodiment, the enhanced award opportunity includes employing one of a plurality of different paytables in the game. In different embodiments, the enhanced award opportunity includes, but is not limited to: (i) one of a plurality of different volatilities of the game (ii) one of a plurality of different average expected payback percentages of the game; (iii) eligibility for a different type or kind of game; (iv) eligibility for one or more modifiers; (v) eligibility for one or more multipliers; (vi) eligibility for play of a bonus game; (vii) eligibility for a different type of bonus game; (viii) eligibility for different types of awards in a bonus game; (ix) eligibility for different bonus functionality; (x) eligibility for a designated award or jackpot award; (xi) eligibility for a spin of an award wheel; (xii) eligibility for enhanced wild symbol features; (xiii) eligibility for one or more locking features; (xiv) eligibility for one or more nudge features; (xv) eligibility for which progressive award level of a multiple level progressive award configuration; (xvi) eligibility for one or more personal progressive awards (i.e., through a player tracking system); (xvii) eligibility for higher ranges for one or more ranged progressive awards; (xviii) eligibility for more frequent triggering of one or more mystery progressive awards; (xix) eligibility for different selection sets in a selection game; (xx) eligibility for the retriggering of one or more components of the game; (xxi) eligibility for a number of free spins; eligibility for free games; (xiii) eligibility for anti-terminator features; (xxiii) eligibility for different symbol sets in the game; (xxiv) eligibility for a different number of active paylines in the game; (xxv) eligibility for information or hints displayed to the player in the game; (xxvi) eligibility for an extra reel in the game; (xxvii) eligibility for different wager features in the game; (xxviii) eligibility to start at different position on a path; (xxix) increased eligibility for any of these; or (xxx) any combination of these.

Referring now generally to FIGS. 6A, 6B, 6C, 6D, 6E, 6F, 6G, and 6H, an example of one embodiment of the present disclosure is illustrated where the gaming device employs Paytable A 98*a* and Paytable B 98*b*, as shown in FIGS. 4A and 4B, respectively.

In one embodiment, the gaming device 10 includes a plurality of different paytables. As discussed above, each paytable includes the symbols or symbol combinations that produce respective awards for a player. In one embodiment, each of the awards associated with each of the paytables are different. In another embodiment, a plurality of the awards are different. In another embodiment, the plurality of awards associated with each of the paytables are the same. In another embodiment, the average expected payout associated with each paytable is different. In another embodiment, the average expected payout associated with each paytable is the same. In another embodiment, the average expected payout associated with each paytable is the same, but the volatility of each paytable is different.

Figure 6A:
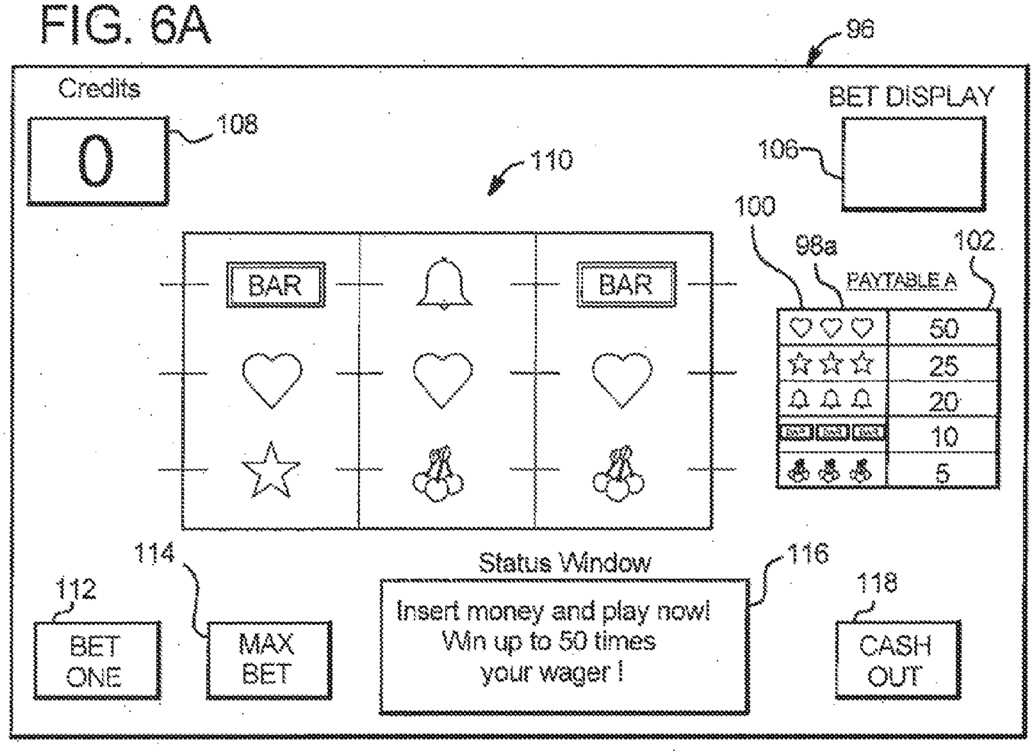
FIGS. 6A, 6B, 6C, 6D, 6E, 6F, 6G, and 6H are enlarged front plan views of a display device of the gaming device disclosed herein, illustrating an example of one embodiment of the present disclosure.

Referring now to FIG. 6A, display device 16 or 18 illustrates one example of a game play screen 96 of one embodiment of the present disclosure. For ease of illustration, each of the relevant apparatus is shown on the same display device 16 or 18. In alternative embodiments, the relevant apparatus are split up at different areas of gaming device 10.

In this example, the display device 16 or 18 displays an initial paytable, Paytable A 98*a*, to the player, as illustrated in FIG. 6A.

The display device 16 or 18 also provides a credit meter 108, a bet display 106, a "bet one" button 112, a "max bet" button 114, and a "cash out" button 118. In this example, the gaming device 10 enables the player to deposit an amount of money. The credit meter 108 displays how much money has been deposited by the player and how many credits or other type(s) of award are provided for playing the game of the present disclosure. During the game, any award 102 received by a player is added to the number of credits indicated by the credit meter 108. Once a game ends, the credit amount indicated by the credit meter 108 is provided to the player.

As shown in FIG. 6A, the display device 16 or 18 displays an audio, visual, or audiovisual message 116 prompting the player to insert money into the gaming device. Because the player has not yet deposited any money, the credit meter 108 indicates that the player's credit amount is zero.

Figure 6B:
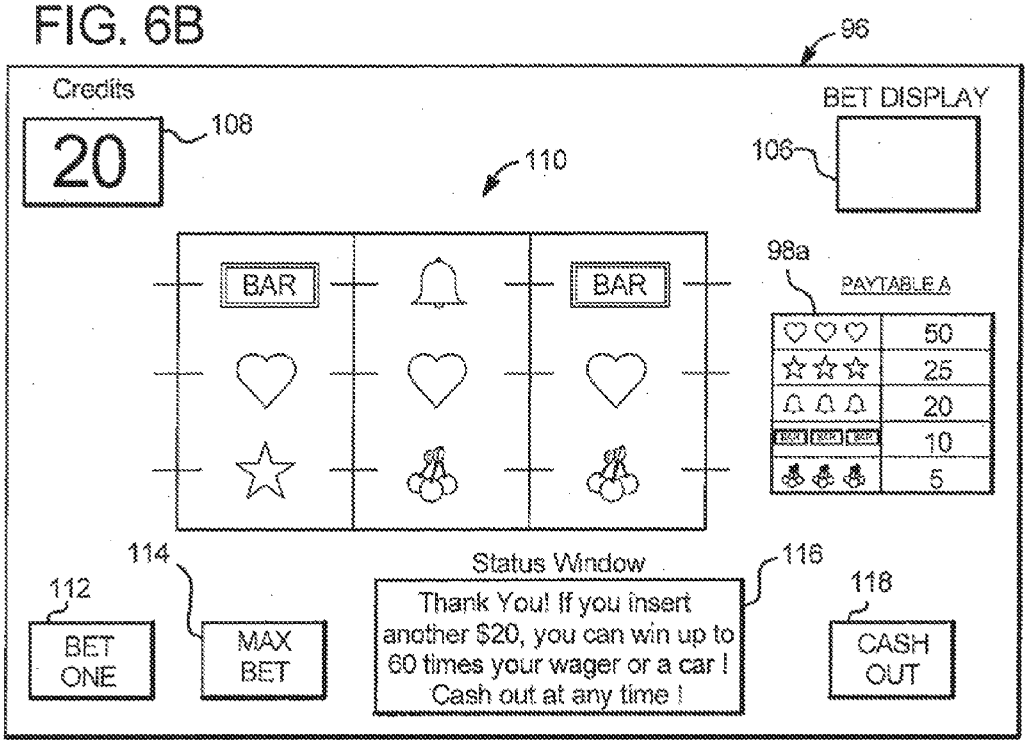

Referring now to FIG. 6B, the player has deposited money into the gaming device. Accordingly, the credit meter indicates that 20 credits have been deposited. The display device 16 or 18 displays an audio, visual, or audiovisual message 116 informing the player that if the player inserts an additional amount of money, the player will be eligible for an enhanced award.

Figure 6C:
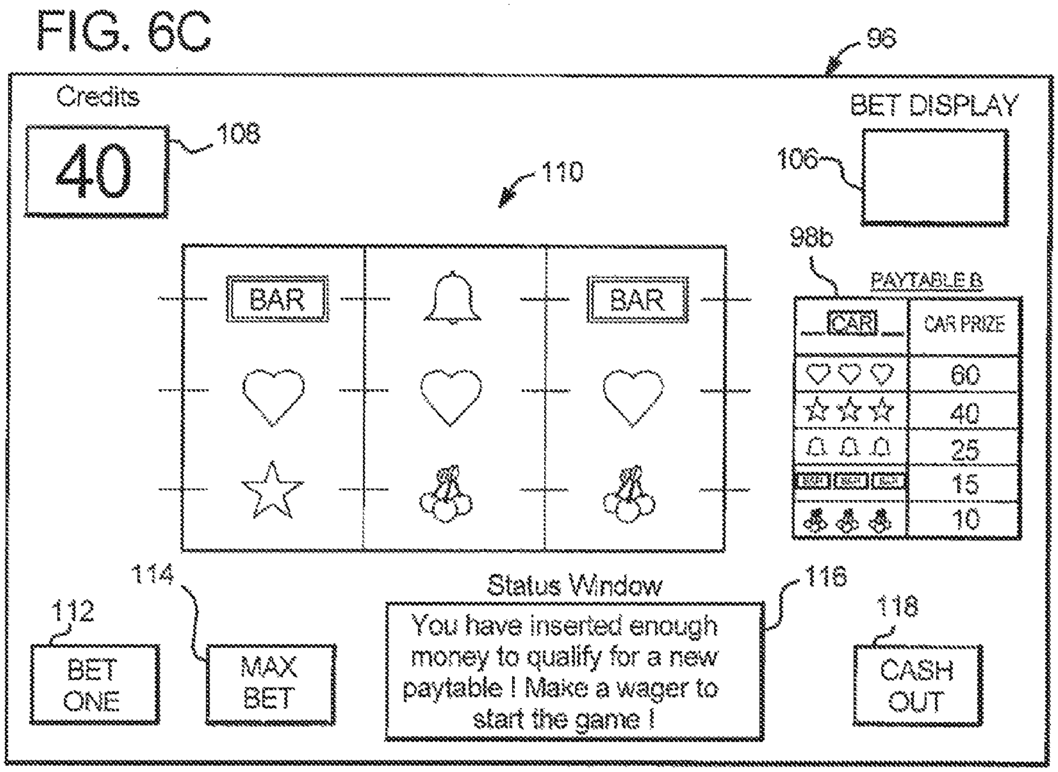

In FIG. 6C, the credit meter 108 shows that 40 credits have been deposited by the player, indicating that the player has chosen to deposit the additional amount of money. After receiving the player's additional deposit, the gaming device 10 displays a new, different paytable, Paytable B 98*b*, because the total amount of the deposited funds achieves a designated level (i.e., 40 credits) which qualifies the player to play with a better, higher-paying paytable.

As shown in FIG. 6C, the display device 16 or 18 displays an audio, visual, or audiovisual message 116 informing the player that he/she has deposited enough money to qualify for a new paytable (Paytable B 98*b*) and prompting the player to use the deposited funds to place a wager to initiate a game.

In this example, the game is a slot game. However, it should be appreciated that the game of the present disclosure may be any suitable game operable on a wager, such as poker, blackjack, craps, keno, bunco, and any other suitable wagering game.

Figure 6D:
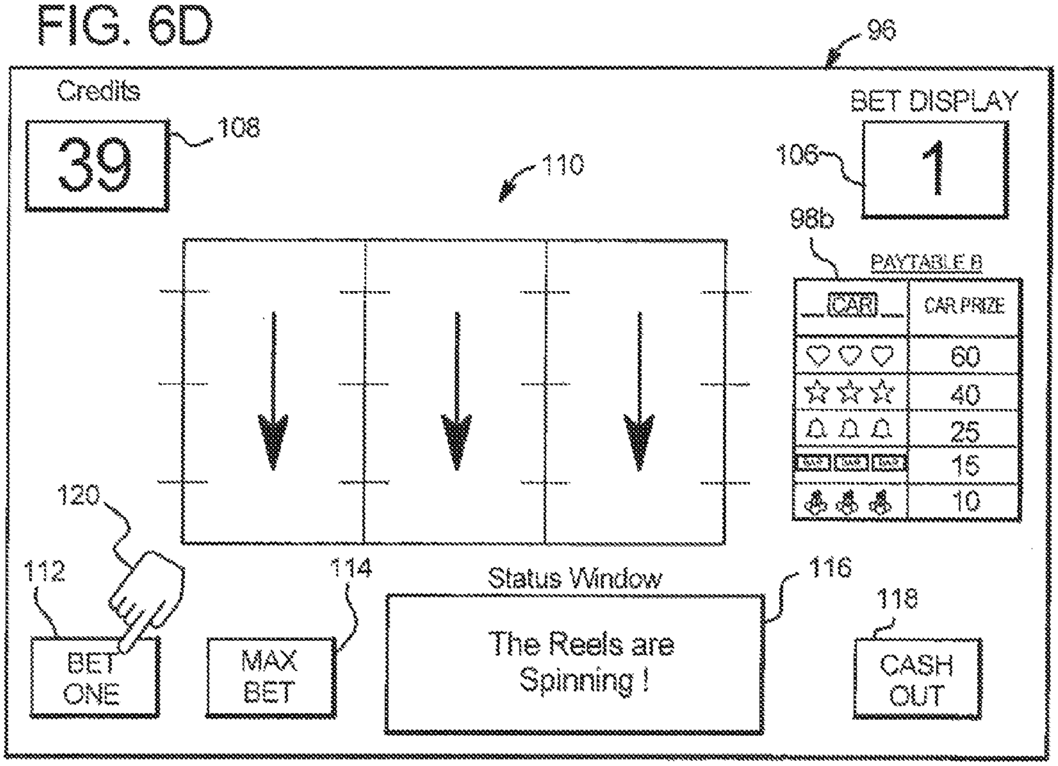

As illustrated in FIG. 60, the player 120 pushes the bet one button 112 to place a wager to initiate a game. When the player 120 pushes the bet one button 112, the number of credits shown in the credit meter 108 preferably decreases by one, and the number of credits shown in the bet display 106 preferably increases by one. Accordingly, the bet display 106 indicates the number 1, and the credit meter 108 displays the player's remaining credits after using one of the credits to make the wager in. That is, the credit meter 108 shows the number 39 to reflect the player's remaining credits. Upon receiving the player's wager, the gaming device 10 causes the reels 110 to spin in the game, as seen in FIG. 6D.

Figure 6E:
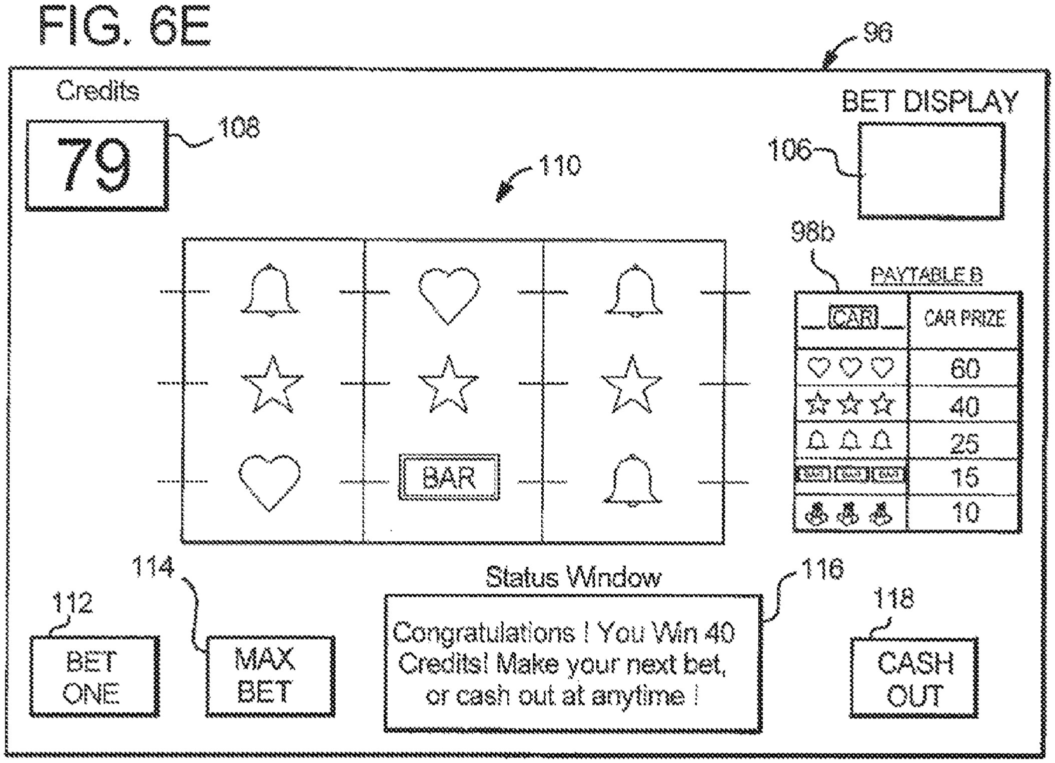

In FIG. 6E, display device 16 or 18 displays the reels 110 after they have stopped spinning. The reels 110 indicate a combination of symbols on the payline or paylines. The indicated symbol combination (i.e., three stars) corresponds to an award 102 of 40 times the player's wager, as illustrated by Paytable B 98*b* in FIG. 6E.

The display device 16 or 18 displays an audio, visual, or audiovisual message 116 indicating that the player has obtained an award of 40 credits (i.e., 40 times the player's wager of 1 credit). The gaming device 10 provides the player with the award of 40 credits. That is, the award of 40 credits is added to the previous credit amount of 39 displayed in the credit meter 108 to give the player a total credits amount of 79, as indicated by the credit meter 108.

It should be appreciated that, in Paytable A 98*a*, the same symbol combination 100 of three stars corresponds to an award 102 of 25 times the player's wager. By depositing the additional funds, the player was eligible to play a game employing Paytable B 98*b*. The player received an award 102 of 40 credits by playing with Paytable B 98*b*. If the player had played the game employing Paytable A 98*a*, the player would only have won 25 credits (i.e., 25 times the player's wager of 1 credit), Thus, in this example, the player wins 15 extra credits for obtaining the three-star symbol combination in the game employing Paytable B 98*b*.

As illustrated in FIG. 6E, the displayed message 116 prompts the player to make another bet to play another iteration of the game and reminds the player that he/she may cash out at any time. The player may, therefore, wager again to try to win more awards.

Figure 6F:
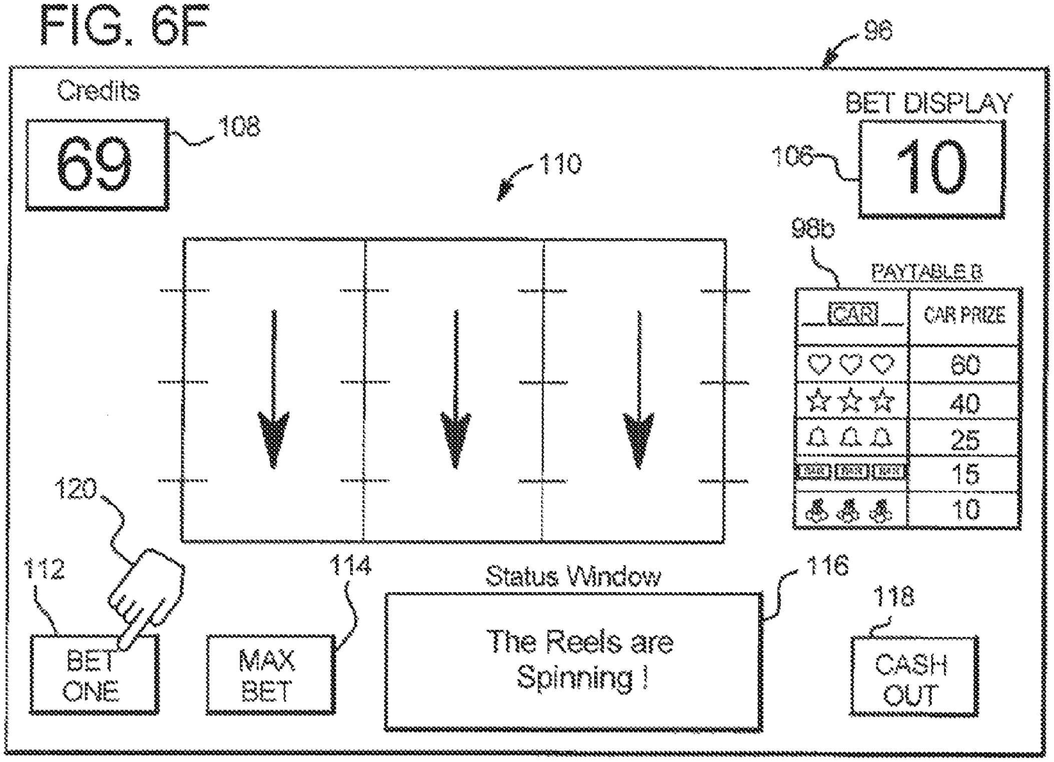

In FIG. 6F, the player 120 places a wager of 10 credits to play another iteration of the game. When the player 120 places the wager of 10 credits, the number of credits shown in the credit meter 108 preferably decreases by ten. The credit meter 108 shows the number 69 to reflect the player's remaining credits after placing the wager. The display device 16 or 18 displays the player's wager of 10 credits in the bet display 106. As seen in FIG. 6F, upon receiving the player's wager of 10 credits, the gaining device 10 causes the reels 110 to spin for the second time.

Figure 6G:
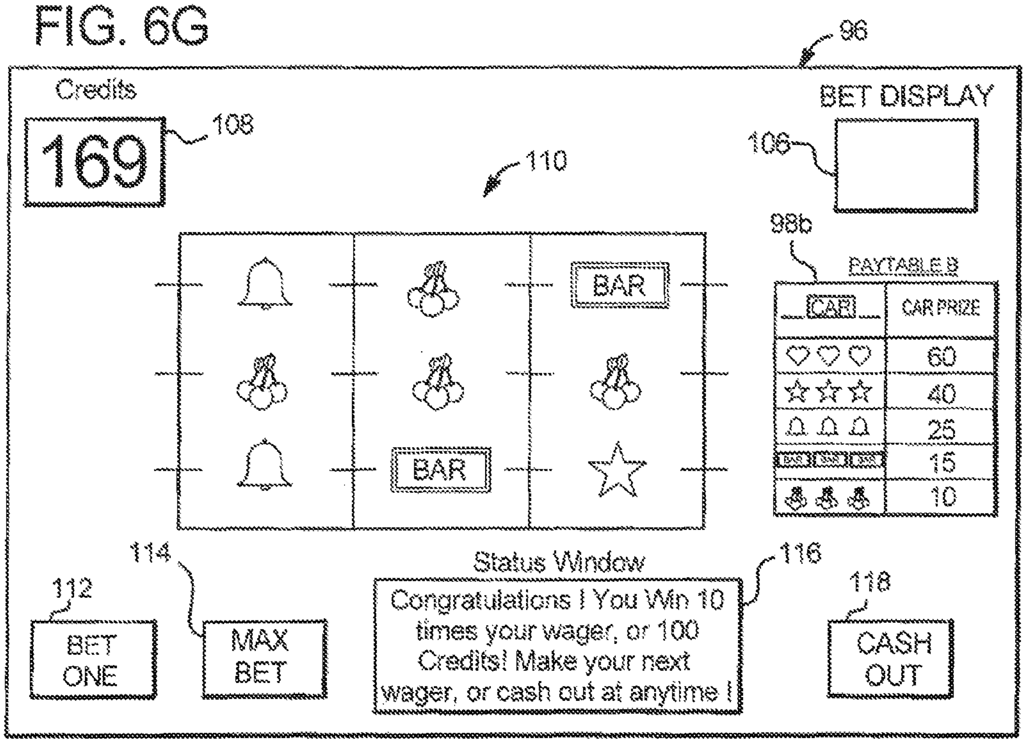

As illustrated in FIG. 6G, the reels 110 have stopped spinning, and display device 16 or 18 displays indicates combinations of symbols on the payline or paylines of the reels 110. A winning combination of symbols 100 is indicated on the center payline of the reels 110 (i.e., three cherries). The indicated symbol combination corresponds to an award 102 of 10 times the player's wager, as seen by the Paytable B 98*b*. The display device 16 or 18 displays an audio, visual, or audiovisual message 116 indicating that the player has obtained an award 102 of 100 credits (i.e., 10 times the player's wager of 10 credits). The gaming device 10 provides the player with the award 102 of 100 credits. That is, the award 102 of 100 credits is added to the previous credit amount of 69 displayed in the credit meter 108 to give the player a total credit amount of 169, as indicated by the credit meter 108.

It should be appreciated that in Paytable A 98*a*, the same symbol combination 100 (i.e., three cherries) corresponds to an award 102 of 5 times the player's wager. By depositing the additional funds, the player was eligible to play the game employing Paytable B 98*b*. The player received an award 102 of 100 credits by playing with Paytable B 98*b*. If the player had played the game employing Paytable A 98*a*, the player would only have won 50 credits (i.e., 5 times the player's wager of 10 credits). Thus, in this example, the player wins 50 extra credits for obtaining this symbol combination in the game.

As seen in FIG. 6G, the displayed message 116 prompts the player to make another wager to play another iteration of the game and reminds the player that he/she may cash out at any time, The player may, therefore, wager again to try to win more awards.

Figure 6H:
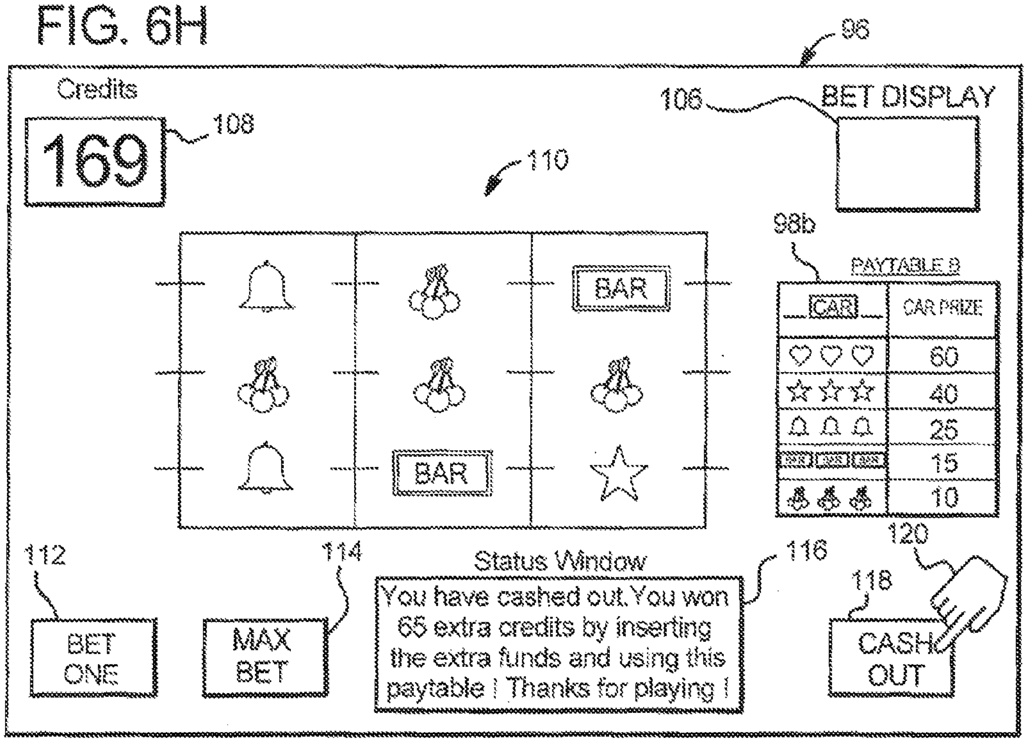

In FIG. 6H, the player 120 presses the cash out button 118, indicating that the player does not wish to continue playing the game. By pressing the cash out button 118, the player may retrieve a cash payment or other suitable form of payment corresponding to some or all of the number of credits remaining and displayed in the credit meter 108. In one embodiment, when the player cashes out, the player receives the coins or tokens in a coin payout tray. In one embodiment, when the player cashes out, the player may receive other payout mechanisms such as tickets or credit slips redeemable by a cashier, funding to the player's electronically recordable identification card, or funding to an account maintained by the player, such as on the internet.

As shown in FIG. 6H, the display device 16 or 18 displays an audio, visual, or audiovisual message 116 informing the player that the player has won 65 extra credits in the game. By inserting the additional funds and thereby causing the gaming device 10 to employ Paytable B 98*b* instead of the initially displayed Paytable A 98*a*, the player received enhanced awards for obtaining winning symbol combinations 100 in the game (i.e., 15 extra credits won in the first iteration of the game plus 50 extra credits won in the second iteration of the game).

The above example illustrated in FIGS. 6A to 6H shows how depositing an additional amount of money at or above a designated level increases the level of player excitement and enjoyment. In this example, inserting the additional funds before initiating the game allowed the player to play a game which employed a better, higher-paying paytable. The paytable utilized in the game (Paytable B 98*b*) included larger awards than the initially displayed paytable (Paytable A 98*a*). Also, the gaming device enables the player to discontinue gaming and cash out at any time. Therefore, by depositing the additional funds, the player gains the opportunity to win enhanced awards while maintaining a certain level of control over the game. As the potential for larger awards increases, the player's excitement also increases.

In one embodiment of the present disclosure, the gaming device enables a player to use funds from an account to deposit funds into the gaming device. The account allows the player to keep a balance of money deposited and money won using deposited funds. In one embodiment, the player maintains an account on a gaming server in communication with the gaming device. In this embodiment, a player causes an amount of money to be deposited onto the gaming server. Wagers are subsequently deducted from the deposited amount of money to play on the gaming device. In another embodiment, the player maintains an account that is remote from the gaming device or gaming system. In one such embodiment, players request a desired amount of funds to be transferred from a remote third-party institution or fund repository to the gaming device or gaming system. The requested funds transfer is verified by the third-party institution, transferred to the gaming device or gaming system, and converted to credits or deposited amounts for future play or wagering activity.

While the present disclosure is described in connection with what is presently considered to be the most practical and preferred embodiments, it should be appreciated that the present disclosure is not limited to the disclosed embodiments, and is intended to cover various modifications and equivalent arrangements included within the spirit and scope of the claims. Modifications and variations in the present disclosure may be made without departing from the novel aspects of the invention as defined in the claims, and this application is limited only by the scope of the claims.

The invention is claimed as follows:

1. A gaming system comprising:
at least one processor;
at least one display device;
at least one input device; and
at least one memory device storing a plurality of instructions which, when executed by the at least one processor, cause the at least one processor to operate with the at least one display device and the at least one input device to:
(a) enable a player to establish a credit balance including an initial quantity of credits;
(b) initiate a gaming session for the player when the player establishes the player's credit balance;
(c) before displaying any plays of any games for the gaming session, the games including a first game and a second different game that is more advantageous for the player than the first game, determine whether the initial quantity of credits of the player's credit balance is at least a first designated quantity of credits;
(d) if the initial quantity of credits of the player's credit balance is not at least the first designated quantity of credits, for each wager placed by the player until the player's credit balance is less than a second designated quantity of credits:
(i) reduce the player's credit balance by an amount of said wager,
(ii) display a play of the first game, and
(iii) increase the player's credit balance by any determined awards of credits for said play of the first game; and
(e) if the initial quantity of credits of the player's credit balance is at least the first designated quantity of credits, for each wager placed by the player until the player's credit balance is less than the second designated quantity of credits, regardless of whether the player's credit balance falls below the first designated quantity of credits:
(i) reduce the player's credit balance by an amount of said wager;
(ii) display a play of the second different game; and
(iii) increase the player's credit balance by any determined awards of credits for said play of the second different game.

2. The gaming system of claim 1, wherein the second designated quantity of credits is less than the first designated quantity of credits.

3. The gaming system of claim 2, wherein the second designated quantity of credits is less than one credit.

4. The gaming system of claim 1, wherein the second different game includes at least one selected from the group consisting of: (a) an average expected payback that is greater than an average expected payback of the first game, (b) a volatility that is different than a volatility of the first game, (c) a modifier, (d) eligibility for a bonus game, and (e) eligibility for a progressive award.

5. The gaming system of claim 1, wherein the plurality of instructions, when executed by the at least one processor, cause the at least one processor to operate with the at least one display device and the at least one input device to:
provide (e)(i) to (e)(iii) if a designated period since a termination of a previous gaming session of the player has elapsed; and
provide (d)(i) to (d)(iii) if: (1) the initial quantity of credits of the player's credit balance is at least the designated quantity of credits, and (2) the designated period since the termination of the player's previous gaming session has not elapsed.

6. The gaming system of claim 5, wherein the designated period is one selected from the group consisting of: (a) a month, (b) a week, (c) a day, (d) an hour, and (e) a designated quantity of minutes.

7. A gaming system comprising:
at least one processor;
at least one display device;
at least one input device; and
at least one memory device storing a plurality of instructions which, when executed by the at least one processor, cause the at least one processor to operate with the at least one display device and the at least one input device to:
(a) enable a player to establish a credit balance including an initial quantity of credits;

(b) initiate a gaming session for the player when the player establishes the player's credit balance;

(c) before displaying any plays of any games for the gaming session, the games including a first game and a second different game that is more advantageous for the player than the first game, determine whether the initial quantity of credits of the player's credit balance is at least a first designated quantity of credits;

(d) if the initial quantity of credits of the player's credit balance is not at least the first designated quantity of credits:

(i) enable the player to add an additional quantity of credits to the player's credit balance such that the player's credit balance at least reaches the designated quantity of credits;

(ii) if the player does not add the additional quantity of credits, for each wager placed by the player until the player's credit balance is less than a second designated quantity of credits:

(A) reduce the player's credit balance by an amount of said wager, (B) display a play of the first game, and (C) increase the player's credit balance by any determined awards of credits for said play of the first game; and (iii) if the player adds the additional quantity of credits, for each wager placed by the player until the player's credit balance is less than the second designated quantity of credits, regardless of whether the player's credit balance falls below the first designated quantity of credits:

(A) reduce the player's credit balance by an amount of said wager, (B) display a play of the second different game, and (C) increase the player's credit balance by any determined awards of credits for said play of the second different game; and (e) if the initial quantity of credits of the player's credit balance is at least the first designated quantity of credits, for each wager placed by the player until the player's credit balance is less than the second designated quantity of credits, regardless of whether the player's credit balance falls below the first designated quantity of credits:

(i) reduce the player's credit balance by an amount of said wager;

(ii) display a play of the second different game; and (iii) increase the player's credit balance by any determined awards of credits for said play of the second different game.

8. The gaming system of claim 7, wherein the second designated quantity of credits is less than the first designated quantity of credits.

9. The gaming system of claim 8, wherein the second designated quantity of credits is less than one credit.

10. The gaming system of claim 7, wherein the second different game includes at least one selected from the group consisting of: (a) an average expected payback that is greater than an average expected payback of the first game, (b) a volatility that is different than a volatility of the first game, (c) a modifier, (d) eligibility for a bonus game, and (e) eligibility for a progressive award.

11. The gaming system of claim 7, wherein the plurality of instructions, when executed by the at least one processor, cause the at least one processor to operate with the at least one display device and the at least one input device to:

provide (e)(i) to (e)(iii) if a designated period since a termination of a previous gaming session of the player has elapsed;

provide (d)(ii)(A) to (d)(ii)(C) if: (1) the initial quantity of credits of the player's credit balance is at least the designated quantity of credits, and (2) the designated period since the termination of the player's previous gaming session has not elapsed; and if the initial quantity of credits of the player's credit balance is not at least the designated quantity of credits, enable the player to add the additional quantity of credits to the player's credit balance if the designated period since the termination of the previous gaming session of the player has elapsed.

12. The gaming system of claim 11, wherein the designated period is one selected from the group consisting of: (a) a month, (b) a week, (c) a day, (d) an hour, and (e) a designated quantity of minutes.

13. A method of operating a gaming system, said method comprising:

(a) enabling a player to establish a credit balance including an initial quantity of credits;

(b) initiating a gaming session for the player when the player establishes the player's credit balance;

(c) before displaying any plays of any games for the gaming session, the games including a first game and a second different game that is more advantageous for the player than the first game, causing at least one processor to execute a plurality of instructions stored in at least one memory device to determine whether the initial quantity of credits of the player's credit balance is at least a first designated quantity of credits;

(d) if the initial quantity of credits of the player's credit balance is not at least the first designated quantity of credits, for each wager placed by the player until the player's credit balance is less than a second designated quantity of credits, causing the at least one processor to execute the plurality of instructions to:

(i) reduce the player's credit balance by an amount of said wager, (ii) operate with at least one display device to display a play of the first game, and (iii) increase the player's credit balance by any determined awards of credits for said play of the first game; and (e) if the initial quantity of credits of the player's credit balance is at least the first designated quantity of credits, for each wager placed by the player until the player's credit balance is less than the second designated quantity of credits, causing the at least one processor to execute the plurality of instructions to, regardless of whether the player's credit balance falls below the first designated quantity of credits:

(i) reduce the player's credit balance by an amount of said wager;

(ii) operate with the at least one display device to display a play of the second different game; and (iii) increase the player's credit balance by any determined awards of credits for said play of the second different game.

14. The method of claim 13, wherein the second designated quantity of credits is less than the first designated quantity of credits.

15. The method of claim 14, wherein the second designated quantity of credits is less than one credit.

16. The method of claim 13, wherein the second different game includes at least one selected from the group consisting of: (a) an average expected payback that is greater than an average expected payback of the first game, (b) a volatility that is different than a volatility of the first game, (c) a modifier, (d) eligibility for a bonus game, and (e) eligibility for a progressive award.

17. The method of claim 13, which includes:

providing (e)(i) to (e)(iii) if a designated period since a termination of a previous gaming session of the player has elapsed; and providing (d)(i) to (d)(iii) if: (1) the initial quantity of credits of the player's credit balance is at least the designated quantity of credits, and (2) the designated period since the termination of the player's previous gaming session has not elapsed.

18. The method of claim 17, wherein the designated period is one selected from the group consisting of: (a) a month, (b) a week, (c) a day, (d) an hour, and (e) a designated quantity of minutes.

19. The method of claim 13, which is provided through a data network.

20. The method of claim 19, wherein the data network is an internet.

21. A method of operating a gaming system, said method comprising:

(a) enabling a player to establish a credit balance including an initial quantity of credits;

(b) initiating a gaming session for the player when the player establishes the player's credit balance;

(c) before displaying any plays of any games for the gaming session, the games including a first game and a second different game that is more advantageous for the player than the first game, causing at least one processor to execute a plurality of instructions stored in at least one memory device to determine whether the initial quantity of credits of the player's credit balance is at least a first designated quantity of credits;

(d) if the initial quantity of credits of the player's credit balance is not at least the first designated quantity of credits:

(i) enabling the player to add an additional quantity of credits to the player's credit balance such that the player's credit balance at least reaches the designated quantity of credits;

(ii) if the player does not add the additional quantity of credits, for each wager placed by the player until the player's credit balance is less than a second designated quantity of credits, causing the at least one processor to execute the plurality of instructions to:

(A) reduce the player's credit balance by an amount of said wager, (B) operate with the at least one display device to display a play of the first game, and (C) increase the player's credit balance by any determined awards of credits for said play of the first game; and (iii) if the player adds the additional quantity of credits, for each wager placed by the player until the player's credit balance is less than the second designated quantity of credits, causing the at least one processor to execute the plurality of instructions to, regardless of whether the player's credit balance falls below the first designated quantity of credits:

(A) reduce the player's credit balance by an amount of said wager, (B) operate with at least one display device to display a play of the second different game, and (C) increase the player's credit balance by any determined awards of credits for said play of the second different game; and (e) if the initial quantity of credits of the player's credit balance is at least the first designated quantity of credits, for each wager placed by the player until the player's credit balance is less than the second designated quantity of credits, causing the at least one processor to execute the plurality of instructions to, regardless of whether the player's credit balance falls below the first designated quantity of credits:

(i) reduce the player's credit balance by an amount of said wager;

(ii) operate with the at least one display device to display a play of the second different game; and (iii) increase the player's credit balance by any determined awards of credits for said play of the second different game.

22. The method of claim 21, wherein the second designated quantity of credits is less than the first designated quantity of credits.

23. The method of claim 22, wherein the second designated quantity of credits is less than one credit.

24. The method of claim 21, wherein the second different game includes at least one selected from the group consisting of: (a) an average expected payback that is greater than an average expected payback of the first game, (b) a volatility that is different than a volatility of the first game, (c) a modifier, (d) eligibility for a bonus game, and (e) eligibility for a progressive award.

25. The method of claim 21, which includes:

providing (e)(i) to (e)(iii) if a designated period since a termination of a previous gaming session of the player has elapsed;

providing (d)(ii)(A) to (d)(ii)(C) if: (1) the initial quantity of credits of the player's credit balance is at least the designated quantity of credits, and (2) the designated period since the termination of the player's previous gaming session has not elapsed; and if the initial quantity of credits of the player's credit balance is not at least the designated quantity of credits, enabling the player to add the additional quantity of credits to the player's credit balance if the designated period since the termination of the previous gaming session of the player has elapsed.

26. The method of claim 21, wherein the designated period is one selected from the group consisting of: (a) a month, (b) a week, (c) a day, (d) an hour, and (e) a designated quantity of minutes.

27. The method of claim 21, which is provided through a data network.

28. The method of claim 27, wherein the data network is an internet.

* * * * *